US012534237B2

(12) United States Patent
Garthaffner et al.

(10) Patent No.: US 12,534,237 B2
(45) Date of Patent: *Jan. 27, 2026

(54) APPARATUS FOR FILLING CARTRIDGES OF E-VAPOR DEVICES

(71) Applicant: Altria Client Services LLC, Richmond, VA (US)

(72) Inventors: Travis Martin Garthaffner, Midlothian, VA (US); Jeremy Jay Straight, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,761

(22) Filed: Dec. 4, 2023

(65) Prior Publication Data
US 2024/0101289 A1 Mar. 28, 2024

Related U.S. Application Data

(60) Continuation of application No. 17/587,073, filed on Jan. 28, 2022, now Pat. No. 11,834,213, which is a
(Continued)

(51) Int. Cl.
*B65B 3/32* (2006.01)
*A24F 40/42* (2020.01)
(Continued)

(52) U.S. Cl.
CPC .............. *B65B 3/323* (2013.01); *A24F 40/42* (2020.01); *B65B 3/003* (2013.01); *B65B 37/20* (2013.01);
(Continued)

(58) Field of Classification Search
None
See application file for complete search history.

(56) References Cited

U.S. PATENT DOCUMENTS

| 1,046,762 A | 12/1912 | Fleming |
| 3,830,265 A | 8/1974 | Matejek |

(Continued)

FOREIGN PATENT DOCUMENTS

| CA | 1101809 A | 5/1981 |
| DE | 2045837 A1 | 4/1971 |
| WO | WO-2016105191 A1 | 6/2016 |

OTHER PUBLICATIONS

International Search Report and Written Opinion for corresponding Application No. PCT/EP2017/084107 dated Mar. 21, 2018.
(Continued)

*Primary Examiner* — Matthew W Jellett
(74) *Attorney, Agent, or Firm* — Harness, Dickey & Pierce, P.L.C

(57) ABSTRACT

An apparatus for the automated filling of cartridges of e-vapor devices may include a filling drum configured to receive at least one cartridge of an e-vapor device. The apparatus may additionally include a needle assembly including at least one hypodermic needle. The needle assembly is configured to transition between a lowered state and a raised state. The lowered state is where the hypodermic needle is moved down into the cartridge, while the raised state is where the hypodermic needle is lifted up and away from the cartridge. The apparatus may further include a pump assembly configured to pump a pre-vapor formulation into the cartridge when the needle assembly is in the lowered state. The pump assembly may include a variable amplitude cam system configured to adjust an amount of the pre-vapor formulation for pumping to the cartridge without changing start and stop times for the pumping.

20 Claims, 18 Drawing Sheets

Related U.S. Application Data continuation of application No. 16/780,048, filed on Feb. 3, 2020, now Pat. No. 11,267,593, which is a division of application No. 15/390,834, filed on Dec. 27, 2016, now Pat. No. 10,562,748.

(51) Int. Cl.

| | | |
|---|---|---|
| *B65B 3/00* | (2006.01) | |
| *B65B 37/20* | (2006.01) | |
| *B65B 43/60* | (2006.01) | |
| *B65B 59/00* | (2006.01) | |
| *B65B 65/00* | (2006.01) | |
| *B67C 3/22* | (2006.01) | |
| *B67C 3/24* | (2006.01) | |
| *B67C 3/26* | (2006.01) | |
| *F04B 49/12* | (2006.01) | |
| *F04B 1/07* | (2006.01) | |

(52) U.S. Cl.
CPC ............ *B65B 43/60* (2013.01); *B65B 59/001* (2019.05); *B65B 65/00* (2013.01); *B67C 3/225* (2013.01); *B67C 3/24* (2013.01); *B67C 3/26* (2013.01); *F04B 49/125* (2013.01); *F04B 1/07* (2013.01); *F04B 49/121* (2013.01); *F04B 49/128* (2013.01)

(56) References Cited

U.S. PATENT DOCUMENTS

| | | |
|---|---|---|
| 3,837,378 A | 9/1974 | Kanki et al. |
| 3,870,089 A | 3/1975 | Laub, III |
| 4,108,221 A | 8/1978 | Freimuth et al. |
| 4,665,930 A | 5/1987 | Arthur et al. |
| 5,417,260 A | 5/1995 | Perrier |
| 7,059,104 B2 | 6/2006 | Taylor |
| 10,214,306 B2 | 2/2019 | Slurink et al. |
| 2015/0191266 A1 | 7/2015 | Holmes et al. |

OTHER PUBLICATIONS

Written Opinion of the International Preliminary Examining Authority dated Nov. 28, 2018 for corresponding International Application No. PCT/EP2017/084107.

International Preliminary Report on Patentability for Application No. PCT/EP2017/084107 dated May 14, 2019.

APPARATUS FOR FILLING CARTRIDGES OF E-VAPOR DEVICES

CROSS-REFERENCE TO RELATED APPLICATIONS

This application is a continuation under 35 U.S.C. § 120 of U.S. application Ser. No. 17/587,073, filed Jan. 28, 2022, which is a continuation under 35 U.S.C. § 120 of U.S. application Ser. No. 16/780,048, filed Feb. 3, 2020, which is a divisional under 35 U.S.C. § 121 of U.S. application Ser. No. 15/390,834, filed Dec. 27, 2016, the entire contents of each of which are incorporated herein by reference.

BACKGROUND

Field

The present disclosure relates to the manufacture and assembly of e-vapor devices. In particular, the present disclosure relates to the filling of cartridges of e-vapor devices with a pre-vapor formulation.

Description of Related Art

Electronic vapor devices may be manufactured via a number of manual operations. However, such operations are not only labor intensive and time consuming but also more prone to inconsistencies.

SUMMARY

An apparatus for automated filling of cartridges of e-vapor devices may include a filling drum configured to receive at least one cartridge of an e-vapor device. The apparatus may additionally include a needle assembly including at least one hypodermic needle. In an example embodiment, the needle assembly is configured to transition between a lowered state and a raised state. The lowered state is where the at least one hypodermic needle is moved down into the at least one cartridge. Conversely, the raised state is where the at least one hypodermic needle is lifted up and away from the at least one cartridge. The apparatus may further include a pump assembly configured to pump a pre-vapor formulation into the at least one cartridge when the needle assembly is in the lowered state. The pump assembly may include a variable amplitude cam system configured to adjust an amount of the pre-vapor formulation for pumping to the at least one cartridge without changing start and stop times for the pumping.

The filling drum may be configured to rotate and to receive the at least one cartridge while in motion. A time period for the pumping may coincide with at least a 250 degree rotation of the filling drum.

In addition to axial movements, the needle assembly may be configured to move the at least one hypodermic needle radially within the at least one cartridge during the pumping. For example, once in the lowered state, the at least one hypodermic needle may be moved from an inner portion of the reservoir cavity to an internal side wall of the at least one cartridge.

The pump assembly is configured to pump the pre-vapor formulation into the at least one cartridge received by the filling drum while the filling drum is in motion. Additionally, the pump assembly is configured such that a time period for the pumping of the pre-vapor formulation remains constant and independent of adjustments to the amount of the pre-vapor formulation for pumping to the at least one cartridge.

The apparatus may further comprise a feed drum configured to deliver the at least one cartridge to the filling drum. Moreover, the apparatus may further comprise an exit drum configured to remove the at least one cartridge from the filling drum. In an example embodiment, the filling drum, the feed drum, and the exit drum are all present and configured to rotate synchronously such that the at least one cartridge is conveyed in a continuous motion from the feed drum to the exit drum via the filling drum.

A pump assembly for automated filling of cartridges of e-vapor devices may include a pump cam follower configured to interact with a pump cam to effectuate a first displacement corresponding to a general drawing action and to effectuate a second displacement corresponding to a general pumping action for a pre-vapor formulation. The pump assembly may additionally include a variable amplitude cam system configured to translate the general drawing action to an adjusted drawing action and to translate the general pumping action to an adjusted pumping action for the pre-vapor formulation.

The pump cam follower is configured to ride within a pump track extending around the pump cam. The pump cam may be a barrel cam. The pump cam follower may be configured to effectuate a downward displacement corresponding to the general drawing action and an upward displacement corresponding to the general pumping action.

The variable amplitude cam system may include a pivotable track configured to swing downwards about a track pivot to translate the general drawing action to the adjusted drawing action and to swing upwards about the track pivot to translate the general pumping action to the adjusted pumping action. The variable amplitude cam system may also include an adjuster bolt configured to be rotated to attain a desired translation of the general drawing action and the general pumping action to the adjusted drawing action and the adjusted pumping action, respectively. The general drawing action and the general pumping action may be facilitated with an auxiliary slide. The adjusted drawing action and the adjusted pumping action may be facilitated with a primary slide.

A variable amplitude cam system for an apparatus for automated filling of cartridges of e-vapor devices may include a pivotable track configured to swing about a track pivot. The variable amplitude cam system may additionally include an adjuster block arrangement interfacing with the pivotable track such that a swinging of the pivotable track about the track pivot translates to a displacement of the adjuster block arrangement. The variable amplitude cam system may further include an adjuster bolt configured to mate with the adjuster block arrangement via a thread engagement. In an example embodiment, the adjuster bolt is configured to be rotatable to effectuate an incremental shift of the adjuster block arrangement along the adjuster bolt so as to adjust an amount of pre-vapor formulation for pumping to the cartridges.

The adjuster block arrangement may be configured to shift toward the track pivot when the adjuster bolt is rotated in a first direction so as to decrease the amount of pre-vapor formulation for pumping to the cartridges. Conversely, the adjuster block arrangement may be configured to shift away from the track pivot when the adjuster bolt is rotated in an opposite second direction so as to increase the amount of pre-vapor formulation for pumping to the cartridges.

The adjuster block arrangement may include an adjuster block and an adjuster block follower secured to the adjuster block. The pivotable track may define a slot path therein. The adjuster block follower may be configured to shift along the slot path of the pivotable track in response to a rotation of the adjuster bolt.

The adjuster block may define an internally-threaded through hole therein. The adjuster bolt may have an externally-threaded surface and a bolt head at a proximal end of the adjuster bolt. The adjuster bolt may extend though the adjuster block. In an example embodiment, the externally-threaded surface of the adjuster bolt is engaged with the internally-threaded through hole of the adjuster block. The adjuster bolt may be rotatable via the bolt head so as to shift the adjuster block along a length of the adjuster bolt. The adjuster bolt may be configured to alter a vertical displacement of the adjuster block arrangement resulting from the swinging of the pivotable track by altering a distance of the adjuster block arrangement from the track pivot.

The pivotable track may be configured to swing downwards to effectuate a drawing action for procuring the pre-vapor formulation from a reservoir. Conversely, the pivotable track may be configured to swing upwards to effectuate a pumping action for pushing the pre-vapor formulation to the cartridges.

A method for automated filling of cartridges of e-vapor devices may include adjusting a fill amount of pre-vapor formulation by modifying a pump stroke length with a pivotable track and an adjuster bolt while maintaining a constant time period for pumping the pre-vapor formulation into the cartridges.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
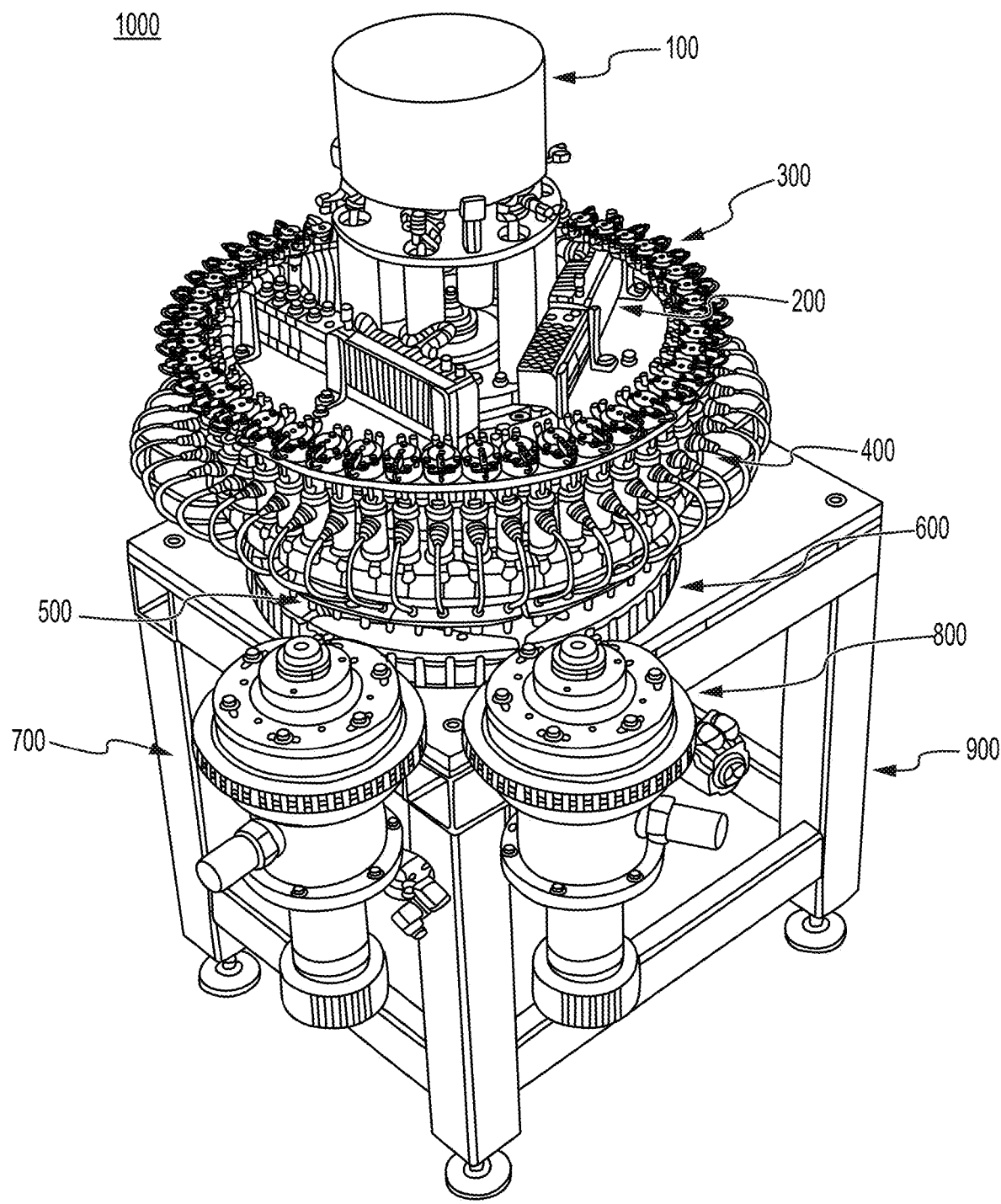
FIG. 1 is a perspective view of an apparatus for automated filling of cartridges of e-vapor devices according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of an apparatus for automated filling of cartridges of e-vapor devices according to an example embodiment. Referring to FIG. 1, the apparatus 1000 includes a reservoir 100 configured to hold a pre-vapor formulation. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerin and propylene glycol. In one instance, the pre-vapor formulation may be a material referred to in the art as an e-liquid.

While the reservoir 100 is shown in FIG. 1 as being open, it should be understood that the reservoir 100 may be provided with a cover or designed such that the structure as a whole has a more enclosed configuration. In addition, the pre-vapor formulation in the reservoir 100 may be replenished as needed when the apparatus 1000 is in operation, when the apparatus 1000 is in a standby state, or when the apparatus 1000 is in an off state. The addition of the pre-vapor formulation to the reservoir 100 may be performed manually (e.g., via pouring from a container) or automatically (e.g., via a supply line connected to a source). Alternatively, the reservoir 100 may be configured as a removable tank that is intended to be replaced with a full (or fuller) tank when the pre-vapor formulation in the existing tank has been depleted or otherwise fallen below a desirable level.

As shown in FIG. 1, the apparatus 1000 additionally includes valve banks 200 and switch valves 300. The valve banks 200 may be Ethernet valve banks. Although three valve banks 200 are shown and placed in a triangular arrangement, it should be understood that example embodiments are not limited thereto. The valve banks 200 may be configured to receive electrical power and timing control signals via a slip ring. The switch valves 300 are controlled by the valve banks 200. Each of the switch valves 300 is associated with and may be arranged above a corresponding one of the pumping units of the pump assembly 400.

After the proper amount of pre-vapor formulation is drawn or pulled into the pump assembly 400 during a first phase of its operation, the switch valves 300 are configured to change the operation of the pump assembly 400 from the first phase to a second phase, wherein the pre-vapor formulation is pumped or pushed to the needle assembly 500. The switch valves 300 may be pneumatic rotary valves configured to rotate so as to alternate between a first position for the drawing/pulling action and a second position for the pumping/pushing action. Because each of the switch valves 300 is associated with a corresponding one of the pumping units of the pump assembly 400, the pumping of the pre-vapor formulation can be independently controlled for each pumping unit of the pump assembly 400. As a result, in the event that one or more cartridges were not received (or if one or more pumping units of the pump assembly 400 and/or if one or more needle units of the needle assembly 500 are experiencing issues), then the corresponding switch valves 300 may be used to withhold the pre-vapor formulation until the pumping can be resumed.

The pump assembly 400 is in fluidic communication with the reservoir 100 and is configured to draw the pre-vapor formulation from the reservoir 100 during the first phase of its operation and to pump the pre-vapor formulation to one or more cartridges during the second phase of its operation. In an example embodiment, the pump assembly 400 may be in the form of six subassemblies, wherein each subassembly may include a set of eight pumping units. However, it should be understood that other combinations (with more or less subassemblies/pumping units) are possible based on the operational objectives of the apparatus 1000. For instance, the pump assembly 400 may alternatively be in the form of four subassemblies, wherein each subassembly may include six pumping units.

The needle assembly 500 is configured to move in conjunction with the pump assembly 400 to deliver the pre-vapor formulation for filling the cartridge(s). For example, the needle assembly 500 may be configured to transition between a raised state and a lowered state. In such an embodiment, the timing of the movement of the pump assembly 400 and the needle assembly 500 may be such that the first phase of the operation of the pump assembly 400 (when the pre-vapor formulation is being drawn) coincides with the raised state of the needle assembly 500, while the second phase of the operation of the pump assembly 400 (when the pre-vapor formulation is being pumped) coincides with the lowered state of the needle assembly 500. In addition, the needle assembly 500 may be in the form of a plurality of subassemblies, wherein each subassembly may include a set of needle units. In particular, the number of subassemblies and pumping units of the pump assembly 400 may correspond with the number of subassemblies and needle units of the needle assembly 500 such that each pumping unit of the pump assembly 400 corresponds to a needle unit of the needle assembly 500.

The filling drum 600 is configured to receive and hold one or more cartridges to be filled with pre-vapor formulation. In particular, the filling drum 600 is configured to rotate and to receive the cartridges while in motion. In an example embodiment, a feed drum 700 is configured to deliver unfilled cartridges to the filling drum 600. Additionally, an exit drum 800 may be configured to remove the filled cartridges from the filling drum 600. If the transfer point between the feed drum 700 and the filling drum 600 is regarded as a twelve o'clock position, then the transfer point between the filling drum 600 and the exit drum 800 may be regarded as a nine o'clock position. However, it should be understood that the relative sizes of the filling drum 600, the feed drum 700, and the exit drum 800 may be adjusted in order to increase the residence time of the cartridges on the filling drum 600 (e.g., transfer points at the twelve o'clock and ten o'clock positions).

The filling drum 600, the feed drum 700, and the exit drum 800 are configured to rotate synchronously such that the cartridge(s) is conveyed in a continuous motion from the feed drum 700 to the exit drum 800 via the filling drum 600. The drum-to-drum transfer of the cartridges and associated details, including the orientation of the cartridges, the configuration of the flutes, and the application of a vacuum, may be as disclosed in U.S. application Ser. No. 14/686,431, filed on Apr. 14, 2015, the entire content of which is incorporated herein by reference. The apparatus 1000 is configured to perform the filling operation while the cartridge(s) is being conveyed on the filling drum 600.

The apparatus 1000 may also include a stand 900 configured to support the reservoir 100, valve bank 200, switch valves 300, pump assembly 400, needle assembly 500, filling drum 600, feed drum 700, exit drum 800, and/or associated driving assembly. However, it should be understood that example embodiments should not be limited to the stand 900 illustrated in the drawings. In particular, the structure, shape, and configuration of the stand 900 may be varied as needed depending on the parameters and/or environment in which the apparatus 1000 will operate.

Figure 2:
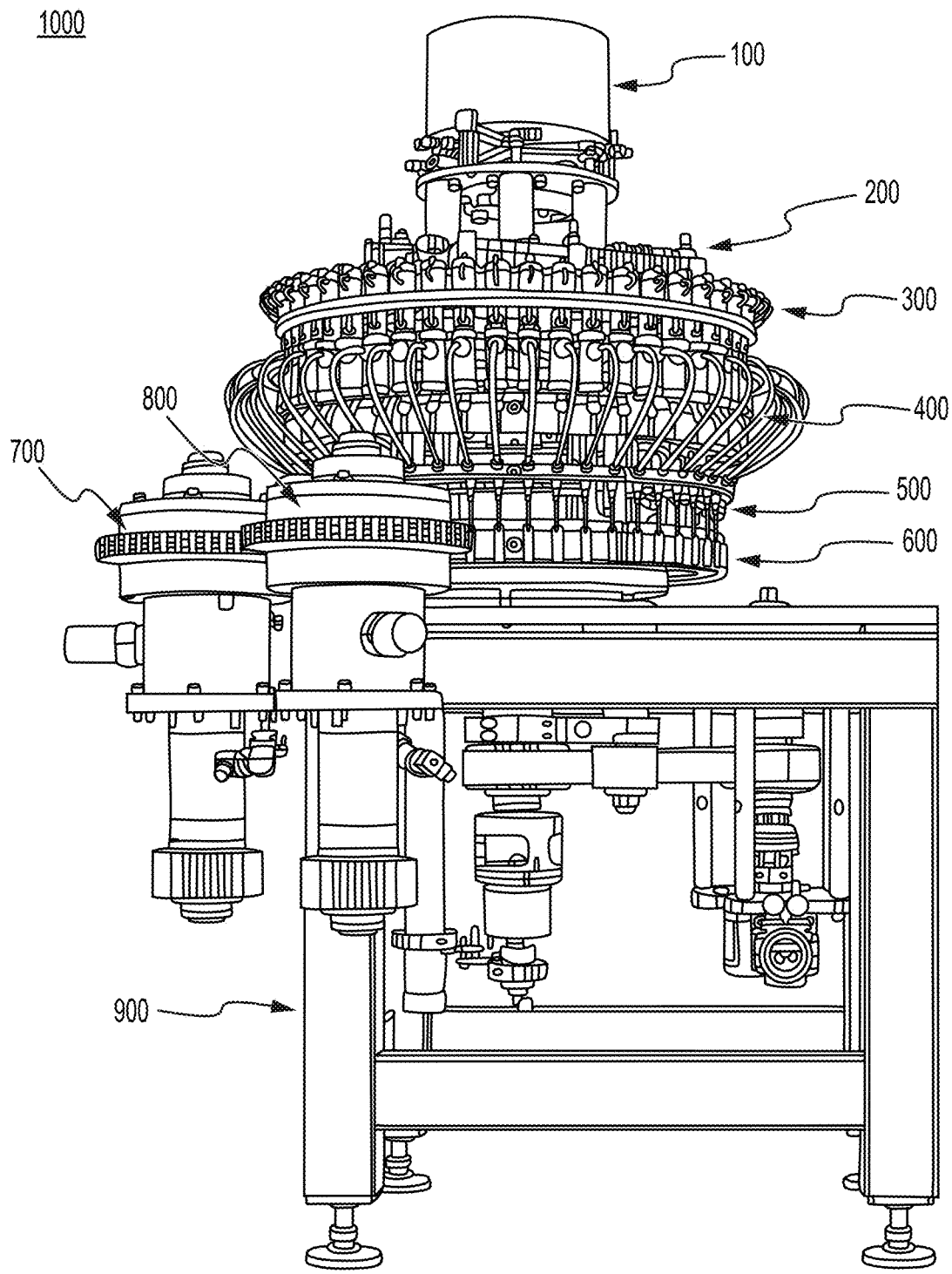
FIG. 2 is a side view of the apparatus of FIG. 1 according to an example embodiment.

FIG. 2 is a side view of the apparatus of FIG. 1 according to an example embodiment. Referring to FIG. 2, the reservoir 100 is arranged above the valve bank 200 and the switch valves 300. The pump assembly 400 may be arranged below the switch valves 300 and above the needle assembly 500. The filling drum 600, the feed drum 700, and the exit drum 800 each have flutes/flutings/fluted surfaces that are positioned at an appropriate height and distance from each other (e.g., horizontally aligned) to permit the drum-to-drum transfer of the cartridges during the operation of the apparatus 1000. The driving assembly of the apparatus 1000 may be situated on an underside of the stand 900. The driving assembly is configured to move the pertinent parts of the apparatus 1000, such as the pump assembly 400, the needle assembly 500, the filling drum 600, the feed drum 700, and/or the exit drum 800, in order to perform the filling operation. The driving assembly may include the appropriate drive shaft(s), belt(s), motor(s), and associated components. The driving assembly may also provide a vacuum (e.g., via a fan) to facilitate the drum-to drum transfer of the cartridges.

Figure 3:
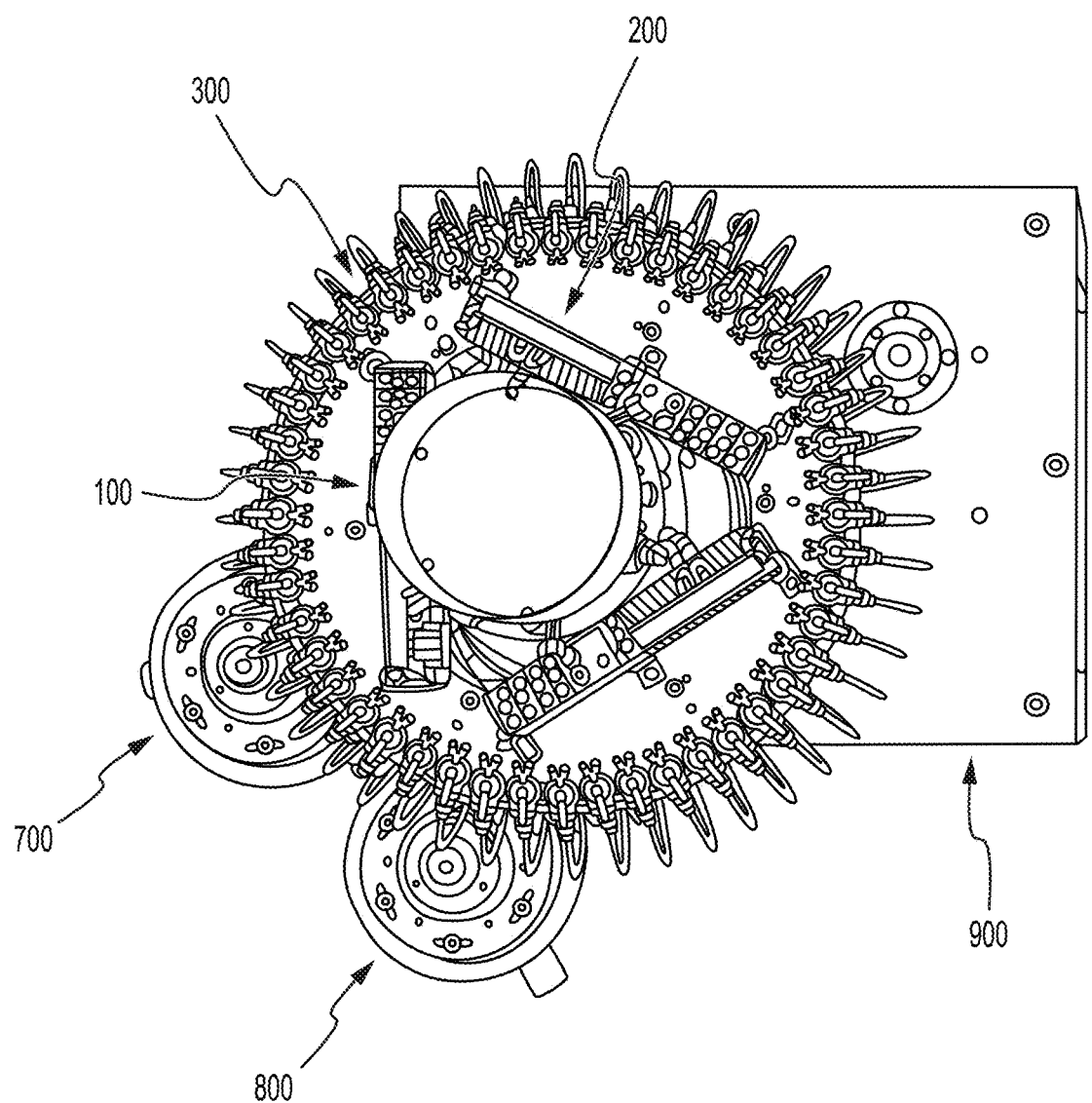
FIG. 3 is a top view of the apparatus of FIG. 1 according to an example embodiment.

FIG. 3 is a top view of the apparatus of FIG. 1 according to an example embodiment. Referring to FIG. 3, the switch valves 300 may be positioned in a circular arrangement around the valve bank 200, although example embodiments are not limited thereto. In addition, the portion of the apparatus 1000 including, inter alia, the filling drum 600 may be mounted near one corner of the stand 900 to facilitate the requisite interaction with the feed drum 700 and the exit drum 800 for the drum-to-drum transfer of the cartridges.

Figure 4:
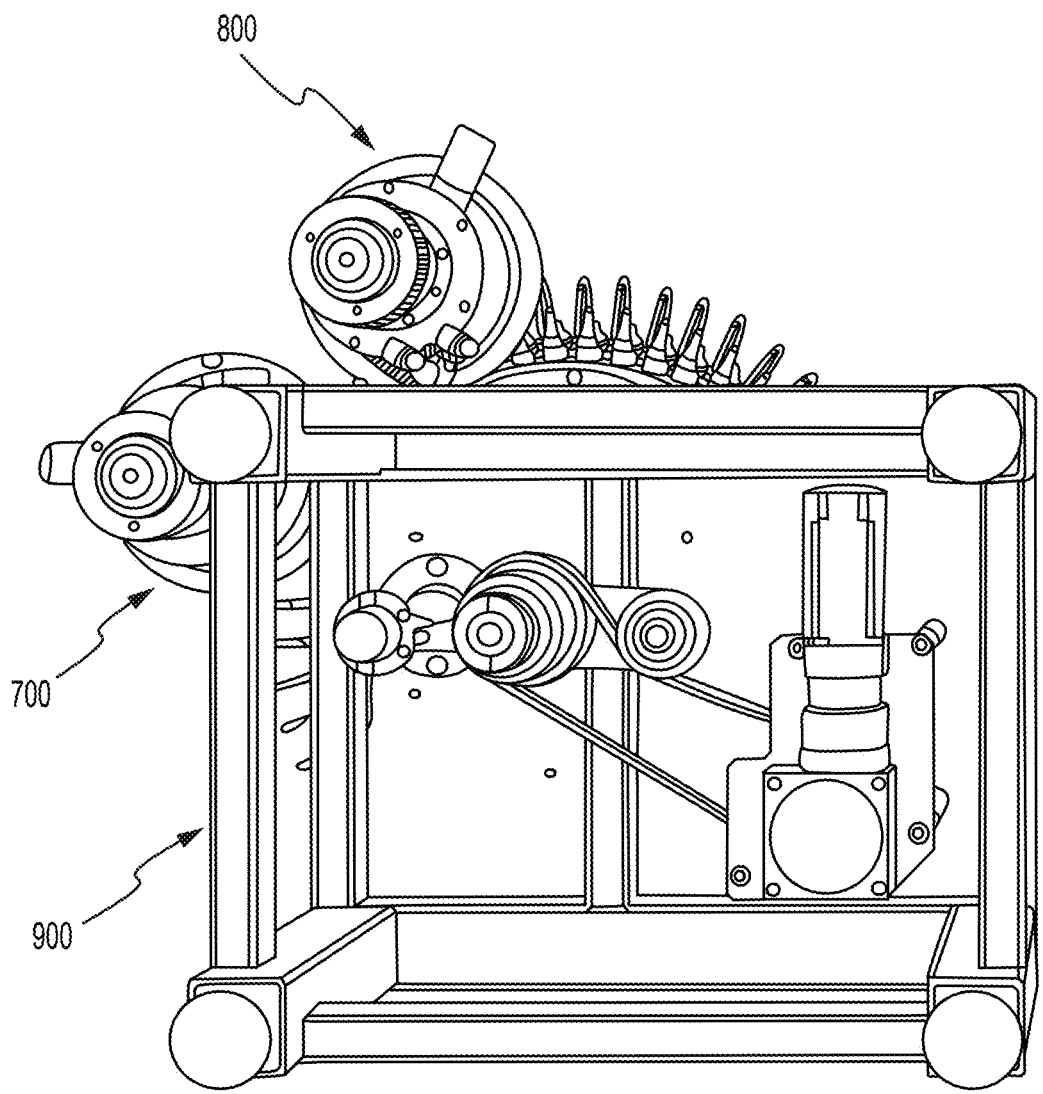
FIG. 4 is a bottom view of the apparatus of FIG. 1 according to an example embodiment.

FIG. 4 is a bottom view of the apparatus of FIG. 1 according to an example embodiment. Referring to FIG. 4, the feed drum 700 and the exit drum 800 may be positioned off of the corner of the stand 900 where the filling drum 600 is mounted. However, it should be understood that example embodiments are not limited thereto and that other suitable arrangements are possible.

In sum, an apparatus 1000 for the automated filling of cartridges of e-vapor devices may include a filling drum 600 configured to receive at least one cartridge of an e-vapor device. The apparatus 1000 may additionally include a needle assembly 500 including at least one hypodermic needle. In an example embodiment, the needle assembly 500 is configured to transition between a lowered state and a raised state. The lowered state may be where the at least one hypodermic needle is moved down into the at least one cartridge. Conversely, the raised state may be where the at least one hypodermic needle is lifted up and away from the at least one cartridge. The apparatus 1000 may further include a pump assembly 400 configured to pump a pre-vapor formulation into the at least one cartridge when the needle assembly 500 is in the lowered state. The pump assembly 400 may include a variable amplitude cam system configured to adjust an amount of the pre-vapor formulation for pumping to the at least one cartridge without changing start and stop times for the pumping. The variable amplitude cam system will be subsequently discussed in further detail.

Figure 5:
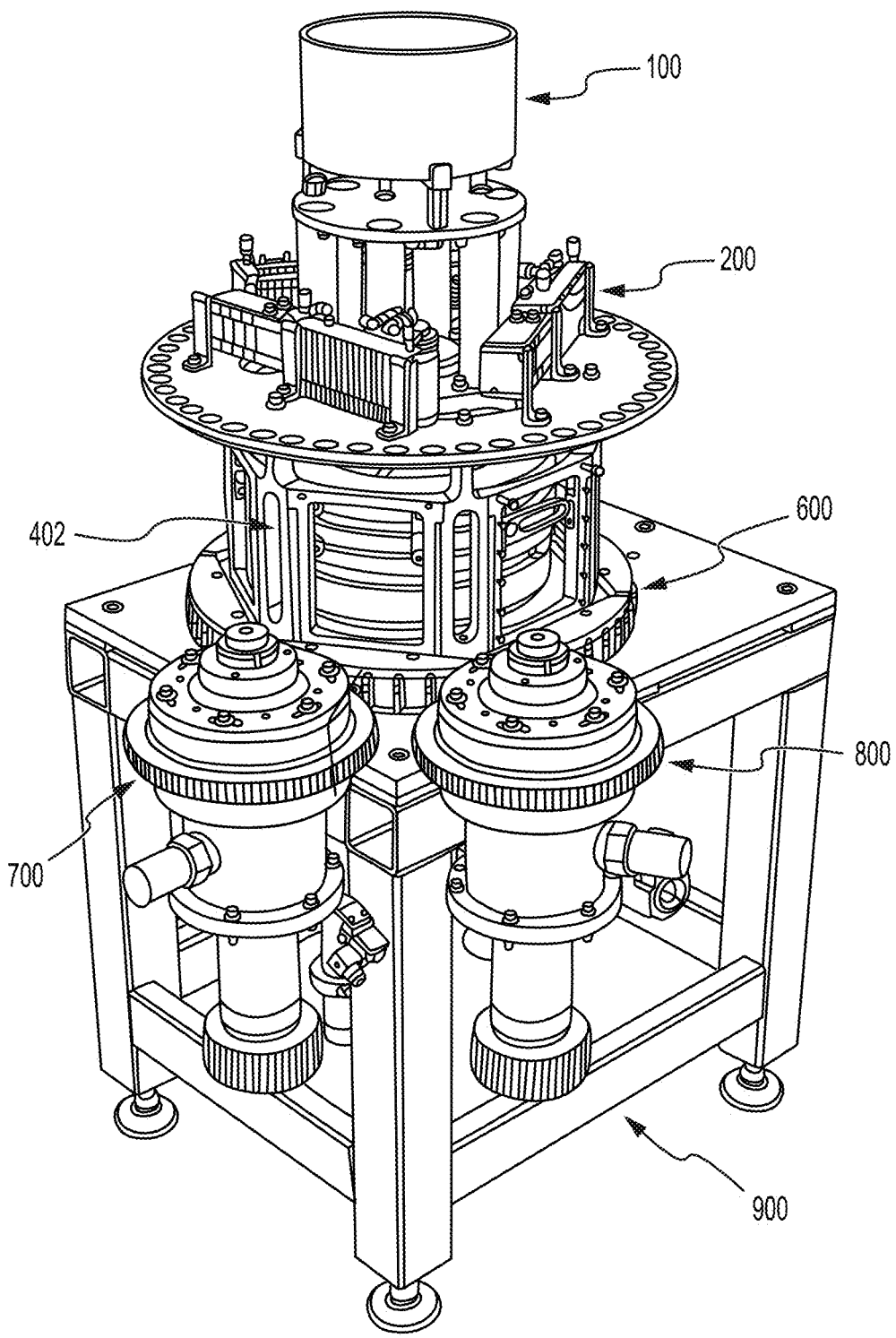
FIG. 5 is a partial view of the apparatus of FIG. 1, wherein structures including the switch valves, the pump assembly, and the needle assembly have not been shown in order to permit a viewing of the inner configuration of the apparatus according to an example embodiment.

FIG. 5 is a partial view of the apparatus of FIG. 1, wherein structures including the switch valves, the pump assembly, and the needle assembly have not been shown in order to permit a viewing of the inner configuration of the apparatus according to an example embodiment. Referring to FIG. 5, a cage 402 may be provided for mounting the pump assembly 400 and the needle assembly 500. The pump assembly 400 and the needle assembly 500 may be slidably mounted on the cage 402 via one or more rails. A pump cam and a needle cam are also arranged inside the cage 402, wherein the pump assembly 400 and the needle assembly 500 are configured to engage with the pump cam and the needle cam, respectively, for axial movement on the rails. The rails, the pump cam, and the needle cam will be subsequently discussed in more detail.

The cage 402 may have a hexagonal shape (e.g., hexagonal prism) and, thus, six mounting side faces, although example embodiments are not limited thereto. In the instance where the cage 402 is hexagonal, the individual pumping units of the pump assembly 400 may be organized into six sets such that each set is mounted on a different side face of the cage 402. Similarly, the individual needle units of the needle assembly 500 may be organized into six sets such that each set is mounted on a different side face of the cage 402. However, as noted above, the cage 402 may have various shapes (depending on the operating parameters and/or environment). In this regard, the cage 402 may have an octagonal shape (e.g., octagonal prism) and, thus, eight mounting side faces. In another non-limiting embodiment, the cage 402 may have a decagonal shape (e.g., decagonal prism) and, thus, ten mounting side faces. In yet another instance, the cage 402 may have a triangular shape (e.g., triangular prism) or regular quadrilateral shape (e.g., square prism). For the designated shape, the individual pumping units of the pump assembly 400 may be organized into the appropriate number of sets for the mounting side faces of the cage 402. Likewise, the individual needle units of the needle assembly 500 may be organized into the appropriate number of sets to correspond to the sets of pumping units of the pump assembly 400.

The cage 402 may be constructed of a plurality of separate structures that are bolted, welded, or otherwise secured together. Alternatively, the cage 402 may be formed as a single, monolithic structure. In a non-limiting embodiment, the cage 402 may be formed by 3D printing or additive manufacturing.

Figure 6:
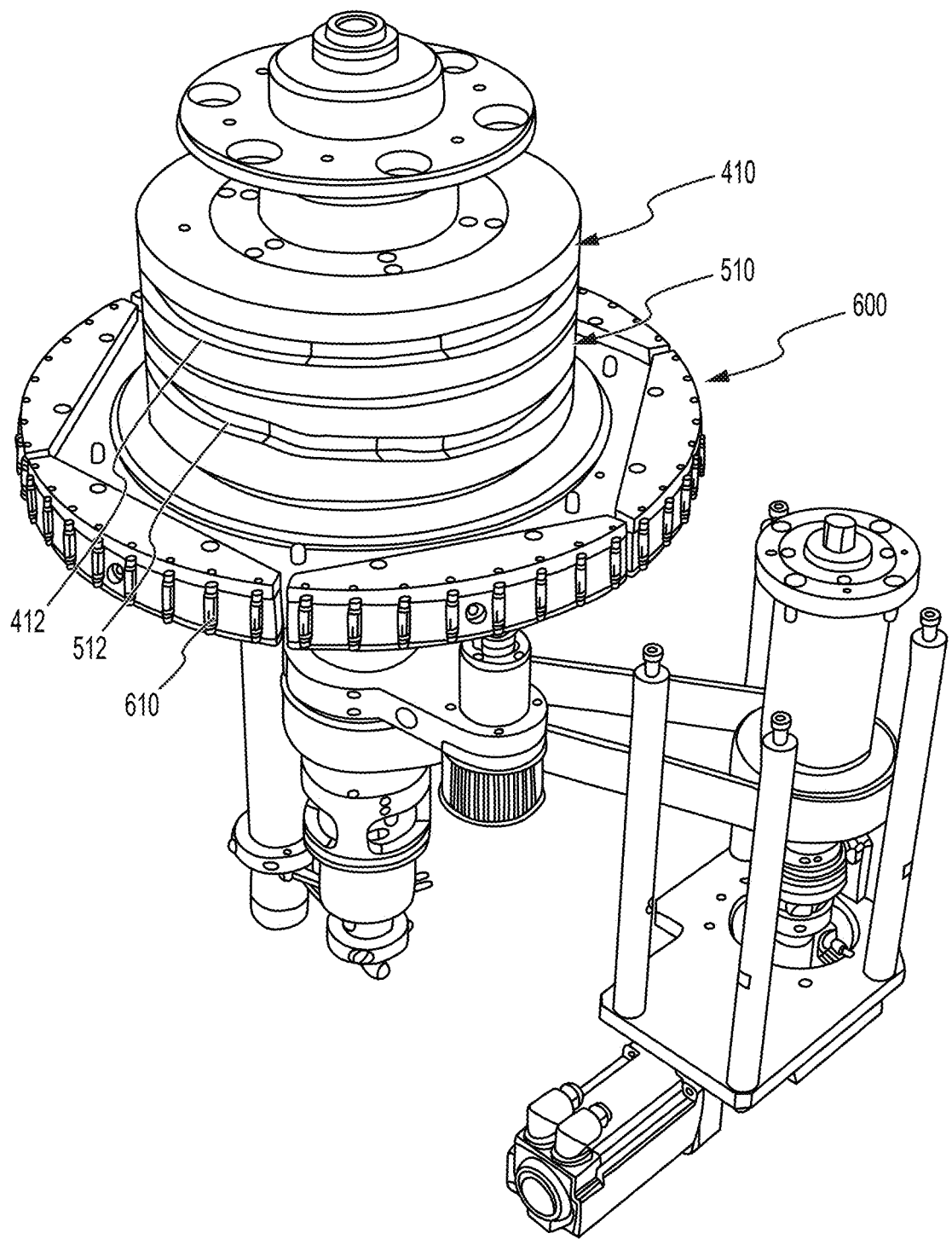
FIG. 6 is a partial view of FIG. 5, wherein additional structures including the reservoir, the valve banks, the feed drum, the exit drum, and the stand have not been shown in order to permit a further viewing of the inner configuration of the apparatus according to an example embodiment.

FIG. 6 is a partial view of FIG. 5, wherein additional structures including the reservoir, the valve banks, the feed drum, the exit drum, and the stand have not been shown in order to permit a further viewing of the inner configuration of the apparatus according to an example embodiment. Referring to FIG. 6, the pump assembly 400 (e.g., in FIG. 1) is configured to engage with a pump cam 410, and the needle assembly 500 (e.g., in FIG. 1) is configured to engage with a needle cam 510. In a non-limiting embodiment, the pump cam 410 and the needle cam 510 are configured to remain stationary, while the filling drum 600 together with the pump assembly 400 and the needle assembly 500 (which are slidably mounted to the cage 402) are configured to rotate during the filling operation. The pump cam 410 is configured to convert the rotational motion of the pump assembly 400 to a linear motion (e.g., up/down movement via one or more rails secured to the cage 402). Similarly, the needle cam 510 is configured to convert the rotational motion of the needle assembly 500 to a linear motion (e.g., up/down movement via one or more rails secured to the cage 402).

The pump cam 410 has a pump track 412 that extends into its side wall and that encircles the pump cam 410. The pump track 412 may be formed simultaneously with the fabrication of the pump cam 410. Alternatively, the pump track 412 may be subsequently cut into the side wall of the pump cam 410 after its fabrication.

A pump cam follower of the pump assembly 400 is configured to ride within the pump track 412 as the pump assembly 400 moves around the pump cam 410. The pump track 412 has an annular form with differing axial positions on the pump cam 410. In particular, one or more portions of the pump track 412 are closer to the upper edge of the pump cam 410, while one or more other portions of the pump track 412 are closer to the lower edge of the pump cam 410. As a result, the portion(s) of the pump track 412 that are closer to the upper edge of the pump cam 410 will cause the pump assembly 400 to move upward (e.g., so as to pump the pre-vapor formulation from the pump assembly 400 into the cartridges 610). Conversely, the portion(s) of the pump track 412 that are closer to the lower edge of the pump cam 410 will cause the pump assembly 400 to move downward (e.g., to draw pre-vapor formulation from the reservoir 100 and into the pump assembly 400).

The needle cam 510 has a needle track 512 that extends into its side wall and that encircles the needle cam 510. The needle track 512 may be formed simultaneously with the fabrication of the needle cam 510. Alternatively, the needle track 512 may be subsequently cut into the side wall of the needle cam 510 after its fabrication.

A needle cam follower of the needle assembly 500 is configured to ride within the needle track 512 as the needle assembly 500 moves around the needle cam 510. The needle track 512 has an annular form with differing axial positions on the needle cam 510. In particular, one or more portions of the needle track 512 are closer to the upper edge of the needle cam 510, while one or more other portions of the needle track 512 are closer to the lower edge of the needle cam 510. As a result, the portion(s) of the needle track 512 that are closer to the upper edge of the needle cam 510 will cause the needle assembly 500 to move upward (e.g., to a raised state such that the hypodermic needles are lifted up and away from the cartridges 610). Conversely, the portion(s) of the needle track 512 that are closer to the lower edge of the needle cam 510 will cause the needle assembly 500 to move downward (e.g., to a lowered state such that the hypodermic needles extend into the cartridges 610).

In addition to axial (e.g., up/down) movements, the needle assembly 500 may be configured to move the hypodermic needle(s) radially within the cartridge(s) 610 prior to or during the pumping (e.g., inward/outward movement relative to the central axis of the needle cam 510). For example, a hypodermic needle may be lowered into a central section of the cartridge 610 when the needle assembly 500 transitions to the lowered state. The central section of the cartridge 610 may coincide approximately with a central longitudinal axis of the cartridge 610. In another instance, the hypodermic needle may be lowered in an off-centered section of the cartridge 610 while still being closer to the central longitudinal axis of the cartridge 610 than the internal side wall of the cartridge 610. Once in the lowered state, the hypodermic needle may be moved from an inner portion of the reservoir cavity of the cartridge 610 to an internal side wall of the cartridge 610. In this manner, the possibility that the hypodermic needle may catch or strike the edge of the cartridge 610 during the transition to the lowered state may be reduced or precluded.

A third cam (not illustrated) may be provided to effectuate the radial movement of the needle assembly 500. The third cam may be disposed in a slightly off-centered manner (or shaped to provide the pertinent protrusion(s)) to cause the needle assembly 500 to undergo the radial movement. In addition, a biasing structure (e.g., spring) may be used to facilitate the return of the needle assembly 500 to its original positon prior to the radial movement.

The filling drum 600 has a plurality of flutes around its side wall, wherein each flute is configured to hold a cartridge 610. Each flute may have a vacuum port to help hold the cartridge 610 and to timely release the cartridge 610 during a drum-to-drum transfer. Each flute may also have a blow port to eject a cartridge 610 that fails inspection (e.g., a cartridge 610 that is upside down is ejected, thereby preventing damage to the corresponding hypodermic needle when the needle assembly 500 is lowered). In an example embodiment, the plurality of flutes may be provided via a plurality of interchangeable drum blocks. For instance, the filling drum 600 may include six drum blocks with eight flutes each around its periphery, although it should be understood that other combinations are possible. As a result, existing drum blocks may be replaced with different drum blocks with larger (or smaller) flutes and/or a greater (or lesser) number of flutes to accommodate cartridges 610 of other sizes as well as a needle assembly 500 of other configurations. The filling drum 600 may also have a supporting ledge to help prevent the cartridges 610 from being inadvertently pushed out of the flutes during the insertion of the hypodermic needles of the needle assembly 500. The above features in connection with the filling drum 600 are also applicable to the feed drum 700 and the exit drum 800.

The pump assembly 400 is configured to pump the pre-vapor formulation into the cartridges 610 received by the filling drum 600 while the filling drum 600 is in motion (e.g., rotating). A time period for the pumping of the pre-vapor formulation into the cartridges 610 may coincide with at least a 210 degree rotation of the filling drum 600. For example, once a cartridge 610 is transferred to the filling drum 600 by the feed drum 700, the cartridge 610 may spend a residence time on the filling drum that corresponds to about a 270 degree rotation of the filling drum 600 (of which at least about 210 degrees is used for filling). Thus, in a non-limiting embodiment wherein the filling drum 600 rotates clockwise, a cartridge 610 (unfilled) may be transferred from the feed drum 700 to the filling drum 600 at the twelve o'clock position, the filling may take place from the one o'clock position to the eight o'clock position, and the cartridge 610 (now filled) may be transferred to the exit drum 800 at the nine o'clock position. However, during the fabrication of the apparatus 1000, it should be understood that the relative sizes of the filling drum 600, the feed drum 700, and the exit drum 800 may be changed in order to increase the residence time and/or the filling time of the cartridges 610 on the filling drum 600 (e.g., such that a time period for the pumping coincides with at least a 250 degree rotation of the filling drum 600).

Figure 7:
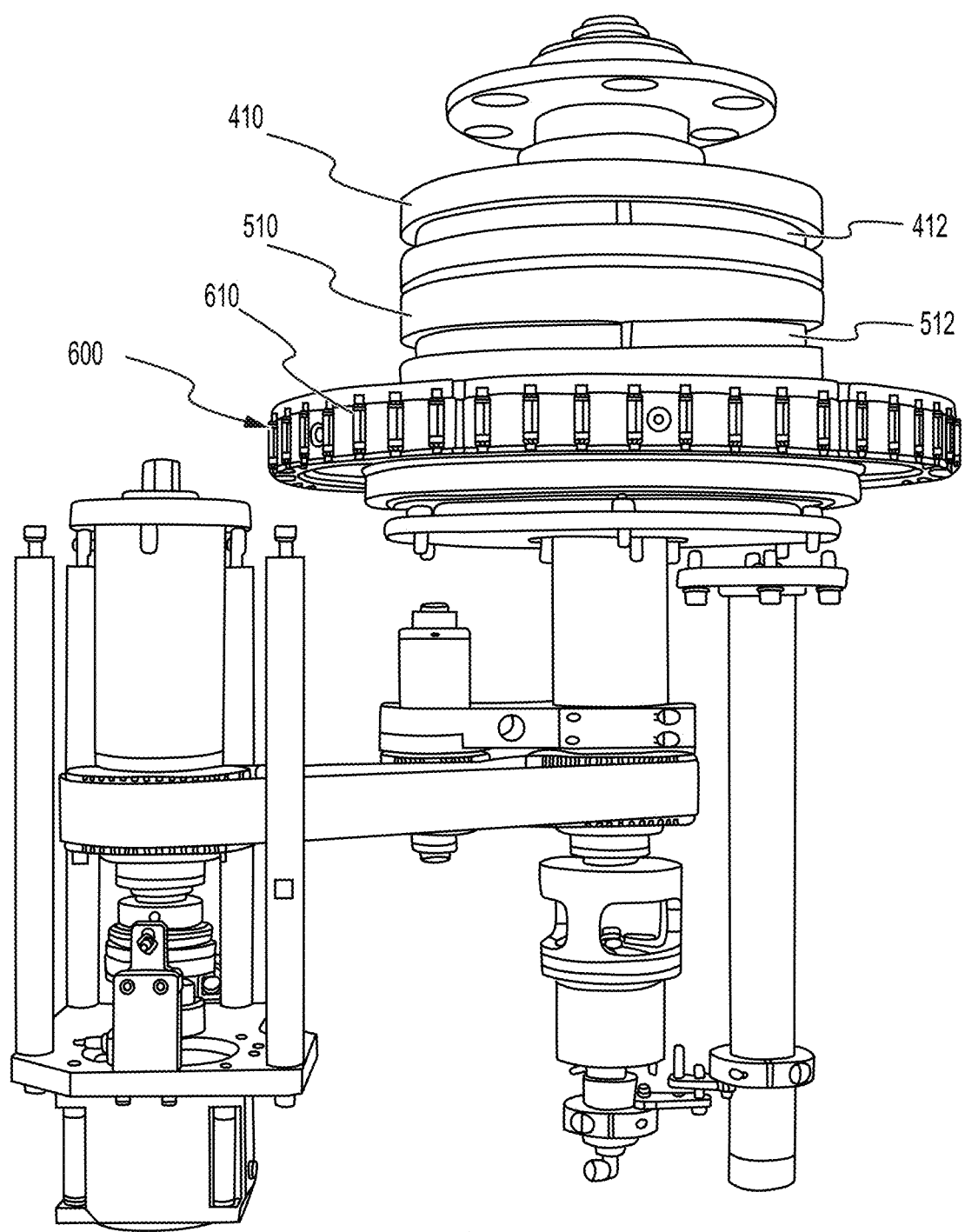
FIG. 7 is a side view of FIG. 6 according to an example embodiment.

FIG. 7 is a side view of FIG. 6 according to an example embodiment. Referring to FIG. 7 and as noted supra, the pump assembly 400 (e.g., in FIG. 1) is configured to engage with the pump cam 410 via the pump track 412, and the needle assembly 500 (e.g., in FIG. 1) is configured to engage with a needle cam 510 via the needle track 512. As a result, when the pump assembly 400 travels around the pump cam 410, the pump track 412 will cause the operation of the pump assembly 400 to move between a first phase (e.g., a downward movement to draw the pre-vapor formulation from the reservoir 100) and a second phase (e.g., an upward movement to pump the pre-vapor formulation to the cartridges 610). In addition, when the needle assembly 500 travels around the needle cam 510, the needle track 512 will cause the needle assembly 500 to move between a raised state and a lowered state. The paths of the pump track 412 and the needle track 512 are coordinated so that the timing of the movements of the pump assembly 400 and the needle assembly 500 may be such that the first phase of the pump assembly 400 (when the pre-vapor formulation is being drawn) coincides with the raised state of the needle assembly 500, while the second phase of the pump assembly 400 (when the pre-vapor formulation is being pumped) coincides with the lowered state of the needle assembly 500.

Figure 8:
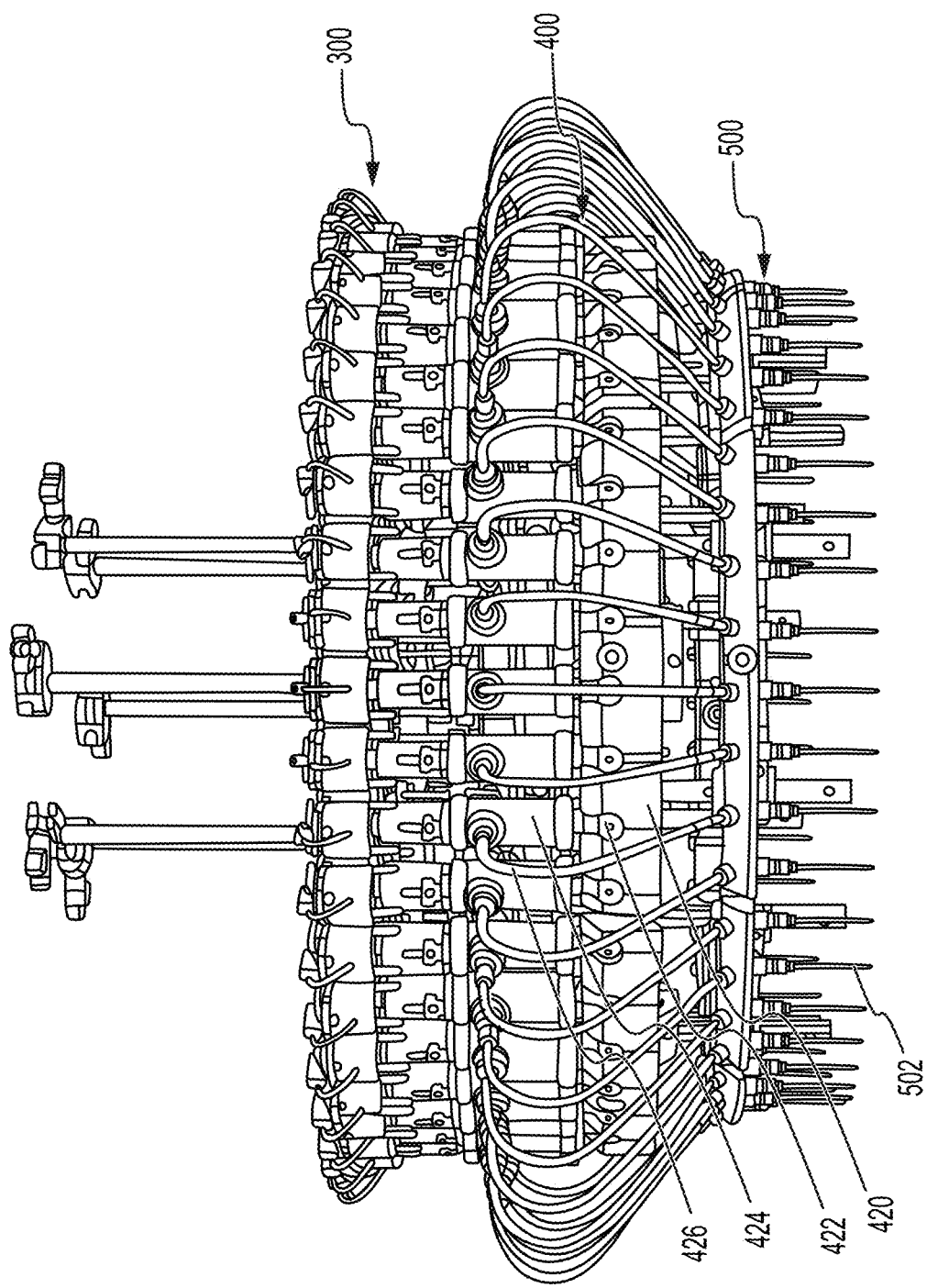
FIG. 8 is a partial view of the apparatus of FIG. 1 including the switch valves, the pump assembly, and the needle assembly according to an example embodiment.

FIG. 8 is a partial view of the apparatus of FIG. 1 including the switch valves, the pump assembly, and the needle assembly according to an example embodiment. Referring to FIG. 8, the pump assembly 400 is operatively connected to the switch valves 300 and the needle assembly 500 so as to perform the pumping of the pre-vapor formulation during the filling operation. The pump assembly 400 and the needle assembly 500 include a plurality of pumping units and needle units, respectively. Each of the pumping units of the pump assembly 400 corresponds to one of the switch valves 300 and one of the needle units of the needle assembly 500, thereby allowing an independent operation of each pair of pumping/needle units via the corresponding one of the switch valves 300.

Each pumping unit of the pump assembly 400 includes a pump barrel 424, a pump plunger 422 tractably-engaged with the pump barrel 424, and a pump tubing 426 connected to the pump barrel 424. The pump plunger 422 is configured to be pulled (protracted) from the pump barrel 424 so as to draw pre-vapor formulation from the reservoir 100 and into the pump barrel 424. Conversely, the pump plunger 422 is also configured to be pushed (retracted) into the pump barrel 424 to pump the pre-vapor formulation from the pump barrel 424 and through the pump tubing 426 to a corresponding needle unit of the needle assembly 500. The pump plunger 422 of the pumping units may be grouped into sets and mounted on a respective pump carriage 420 of a subassembly of the pump assembly 400. For instance, the pump assembly 400 may include six pump carriages 420 with a set of eight pump plungers 422 mounted on each pump carriage 420. However, it should be understood that other combinations are possible depending on the operating parameters and/or environment.

Each needle unit of the needle assembly 500 includes a hypodermic needle 502. The hypodermic needle 502 of each needle unit of the needle assembly 500 is connected to a corresponding pump barrel 424 of the pump assembly 400 by the pump tubing 426 (e.g., via a nipple structure). The hypodermic needle 502 of the needle units may be grouped into sets and mounted on a respective needle carriage of a subassembly of the needle assembly 500. For instance, the needle assembly 500 may include six needle carriages with a set of eight hypodermic needles 502 mounted on each needle carriage. However, it should be understood that other combinations are possible depending on the operating parameters and/or environment.

Figure 9:
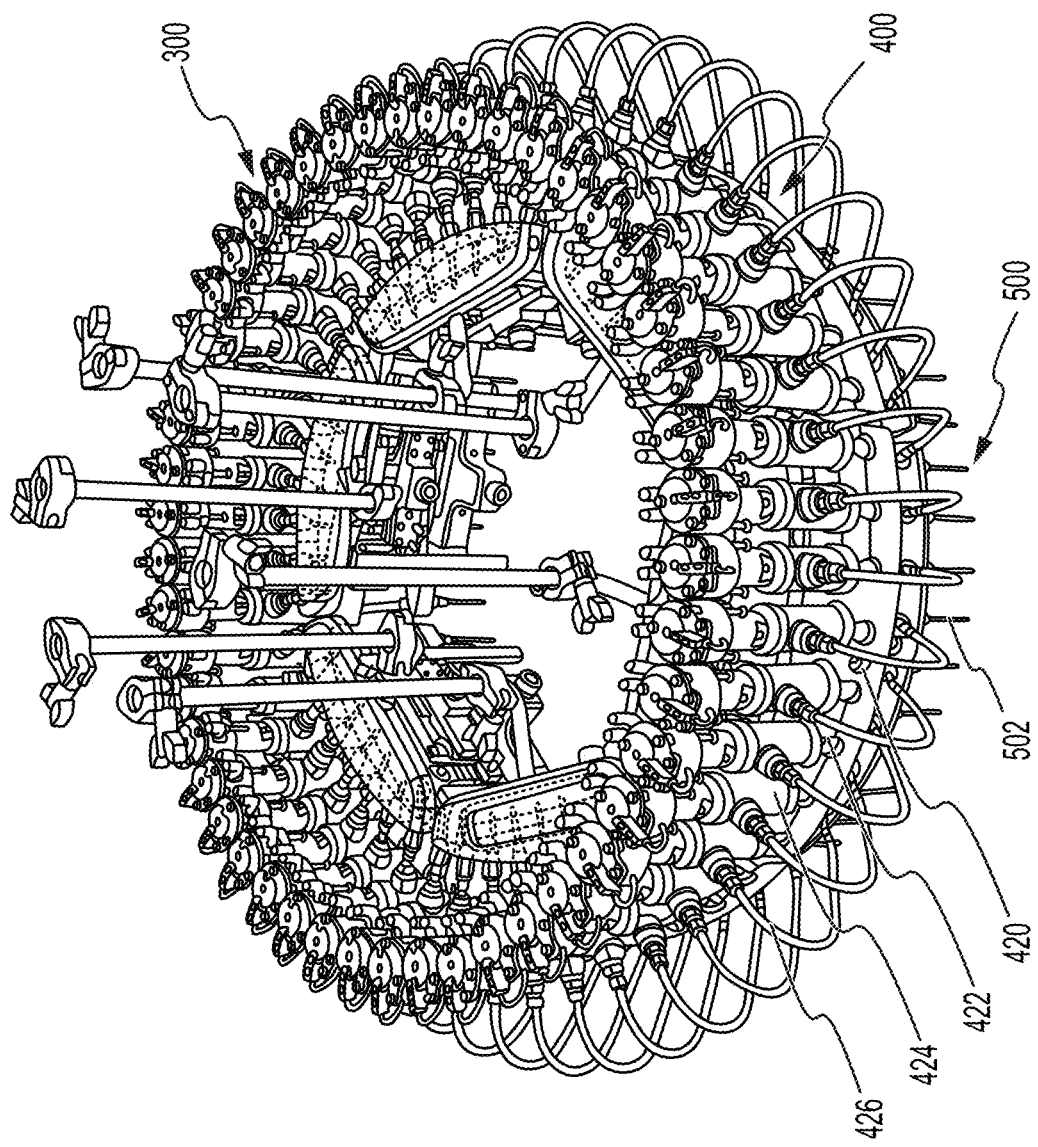
FIG. 9 is an upper perspective view of FIG. 8 according to an example embodiment.

FIG. 9 is an upper perspective view of FIG. 8 according to an example embodiment. Referring to FIG. 9, the switch valves 300 are configured to transition the operation of the pump assembly 400 between a first phase and a second phase by alternating between a first position and a second position, respectively. For instance, the switch valves 300 may be configured to rotate to the first position immediately prior to the downward movement of the pump assembly 400 (to allow the drawing action) and configured to rotate to the second position immediately prior to the upward movement of the pump assembly 400 (to allow the pumping action). Because each of the switch valves 300 is associated with a corresponding pair of pumping/needle units, the timing of the actuation of the pertinent switch valves 300 will depend on the movement of the corresponding subassemblies of the pump assembly 400 and the needle assembly 500.

When the switch valves 300 are in the first position, the passage to the reservoir 100 will be open, while the passage to the pump tubing 426 will be closed. As a result, when the pump plunger 422 protracts from the pump barrel 424 (due to the downward movement of the pump carriage 420), pre-vapor formulation will be pulled from the reservoir 100 into the pump barrel 424 of the pump assembly 400. The passage to the pump tubing 426 and the passage to the reservoir 100 may be on directly opposite sides of the pump barrel 424, although example embodiments are not limited thereto.

Conversely, when the switch valves 300 are in the second position, the passage to the reservoir 100 will be closed, while the passage to the pump tubing 426 will be open. As a result, when the pump plunger 422 retracts into the pump barrel 424 (due to the upward movement of the pump carriage 420), the pre-vapor formulation will be pushed from the pump assembly 400 to the needle assembly 500 and ultimately to the cartridges 610. However, if one or more cartridges 610 happen to be missing, defective, misoriented, and/or if one or more needle units are malfunctioning, the corresponding one or more of the switch valves 300 may be controlled to remain in the first position to prevent the pre-vapor formulation from being pumped to the needle assembly 500.

Figure 10:
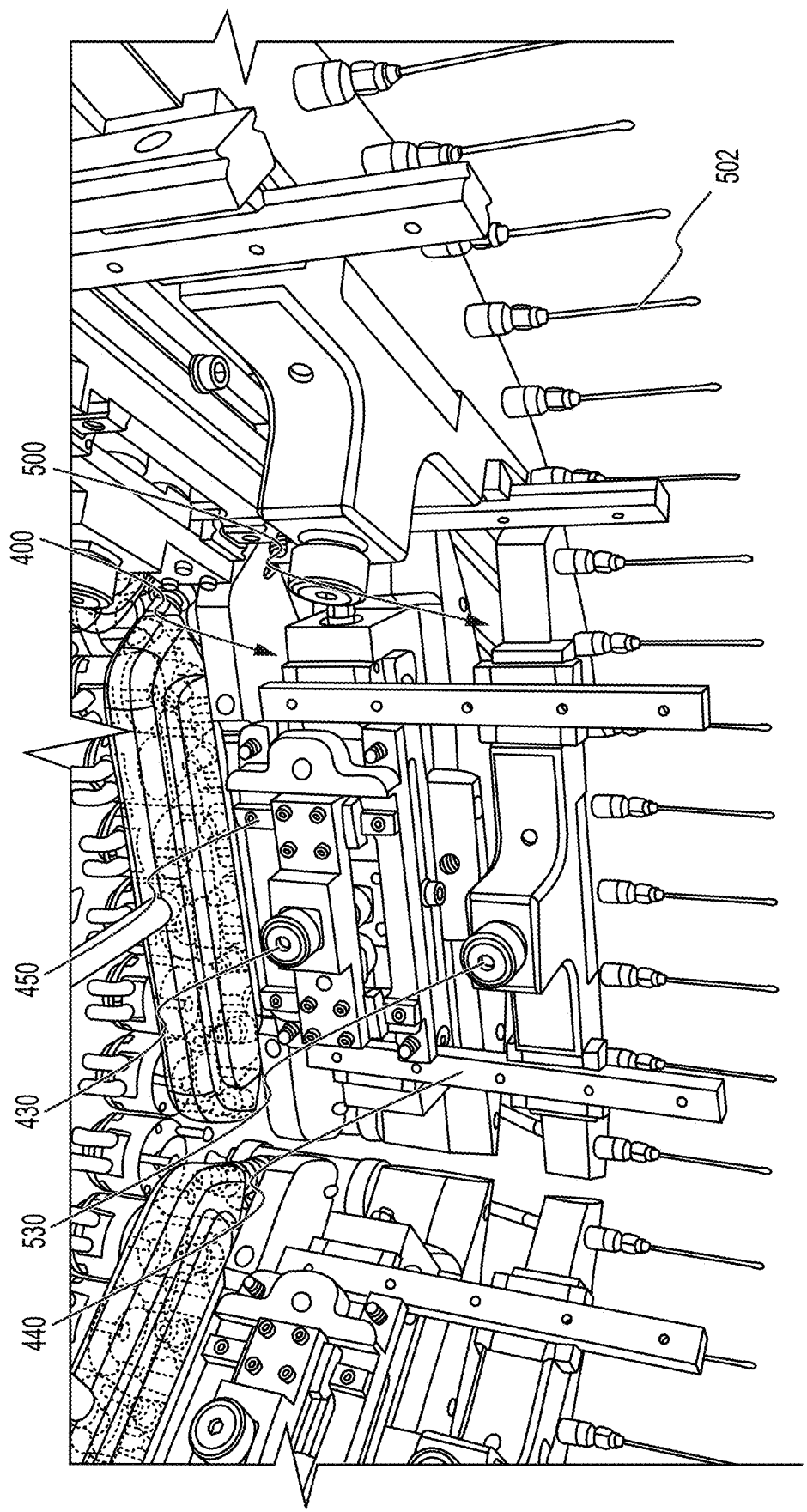
FIG. 10 is an enlarged, lower perspective view of FIG. 8 according to an example embodiment.

FIG. 10 is an enlarged, lower perspective view of FIG. 8 according to an example embodiment. Referring to FIG. 10, the pump assembly 400 includes a pump cam follower 430 that is configured to ride within the pump track 412 of the pump cam 410 (e.g., FIG. 6). Consequently, as the pump assembly 400 travels around the pump cam 410, the pump assembly 400 will also move upwards or downwards along the primary rail 440 due to the varied path of the pump track 412. In a non-limiting embodiment, the primary rail 440 is secured to the cage 402 (e.g., FIG. 5). Additionally and as will be subsequently discussed in more detail, the circumferential movement of the pump cam follower 430 around the pump cam 410 will also result in an initial axial motion along the auxiliary rail 450. This initial axial motion will be translated to an adjusted axial motion of the pump assembly 400 along the primary rail 440 by a variable amplitude cam system. Because the pump track 412 around the pump cam 410 is a set path (which cannot be changed without replacing the pump cam 410), the initial axial motion will be a constant as long as the pump cam 410 is used. On the other hand, the adjusted axial motion can be modified by the adjustable setting of the variable amplitude cam system. The variable amplitude cam system will be subsequently discussed in more detail.

The needle assembly 500 includes a needle cam follower 530 that is configured to ride within the needle track 512 of the needle cam 510 (e.g., FIG. 6). Consequently, as the needle assembly 500 travels around the needle cam 510, the needle assembly 500 will also move upwards or downwards along the primary rail 440 due to the varied path of the needle track 512. Although not illustrated, it should be understood that a variable amplitude cam system may also be provided pursuant to the teachings herein in connection with the needle assembly 500 (e.g., to adjust the lowering distance of the hypodermic needles 502).

Figure 11:
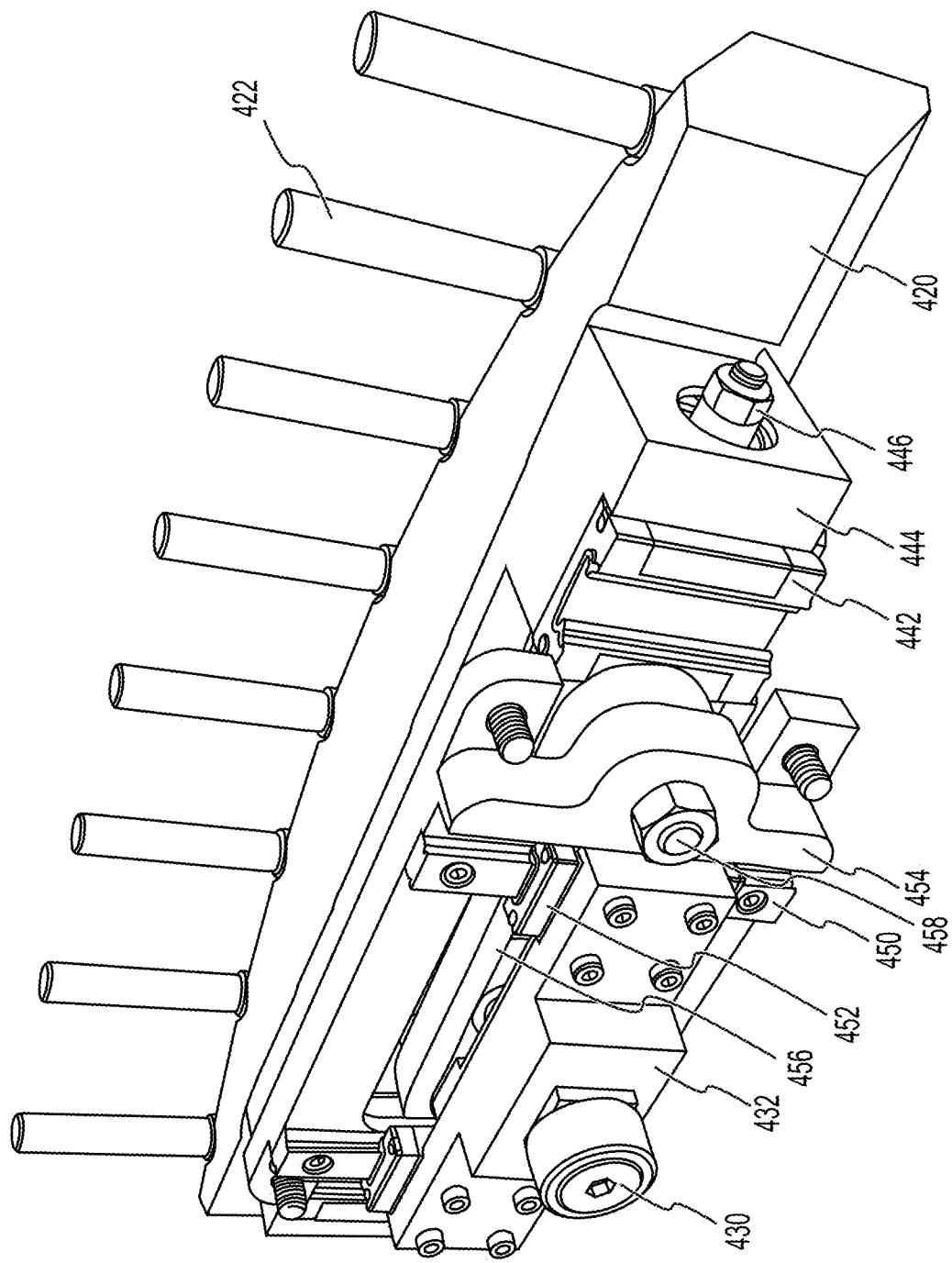
FIG. 11 is a partial view of FIG. 10 including the pump assembly according to an example embodiment.
Figure 12:
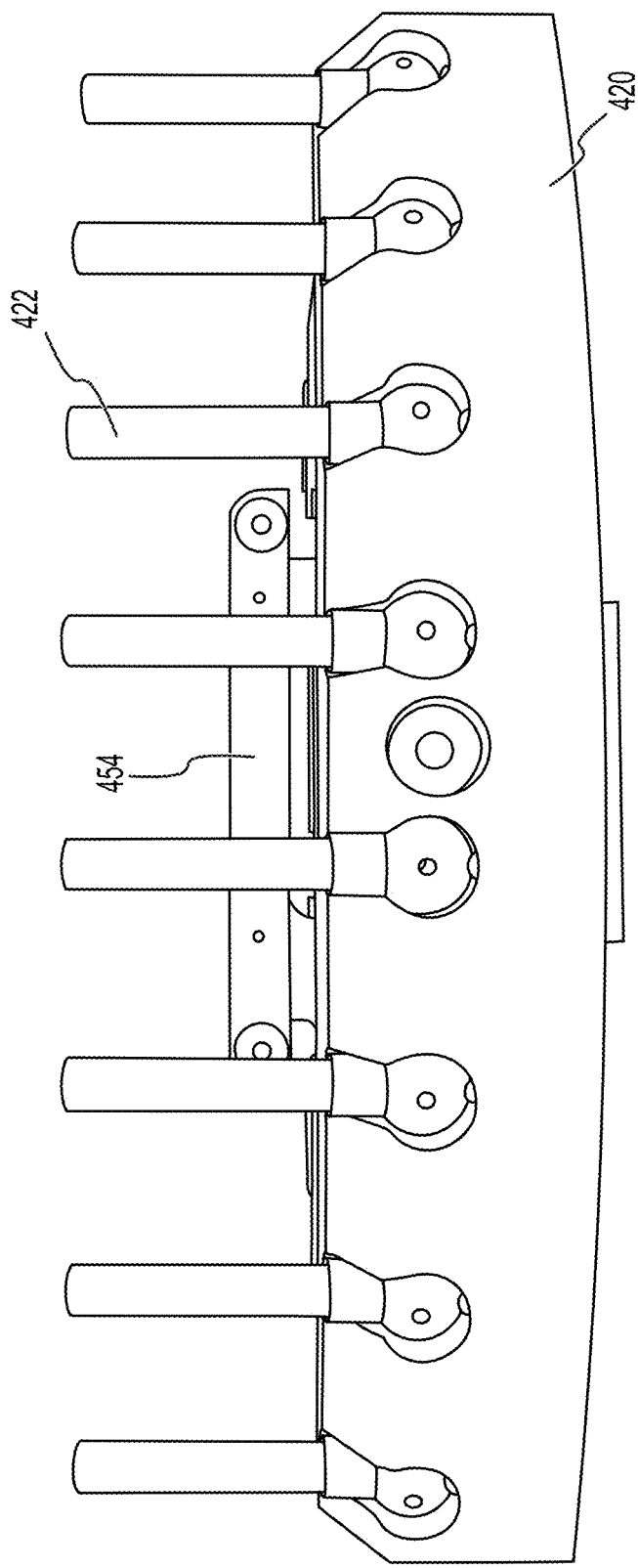
FIG. 12 is a front view of FIG. 11 according to an example embodiment.
Figure 13:
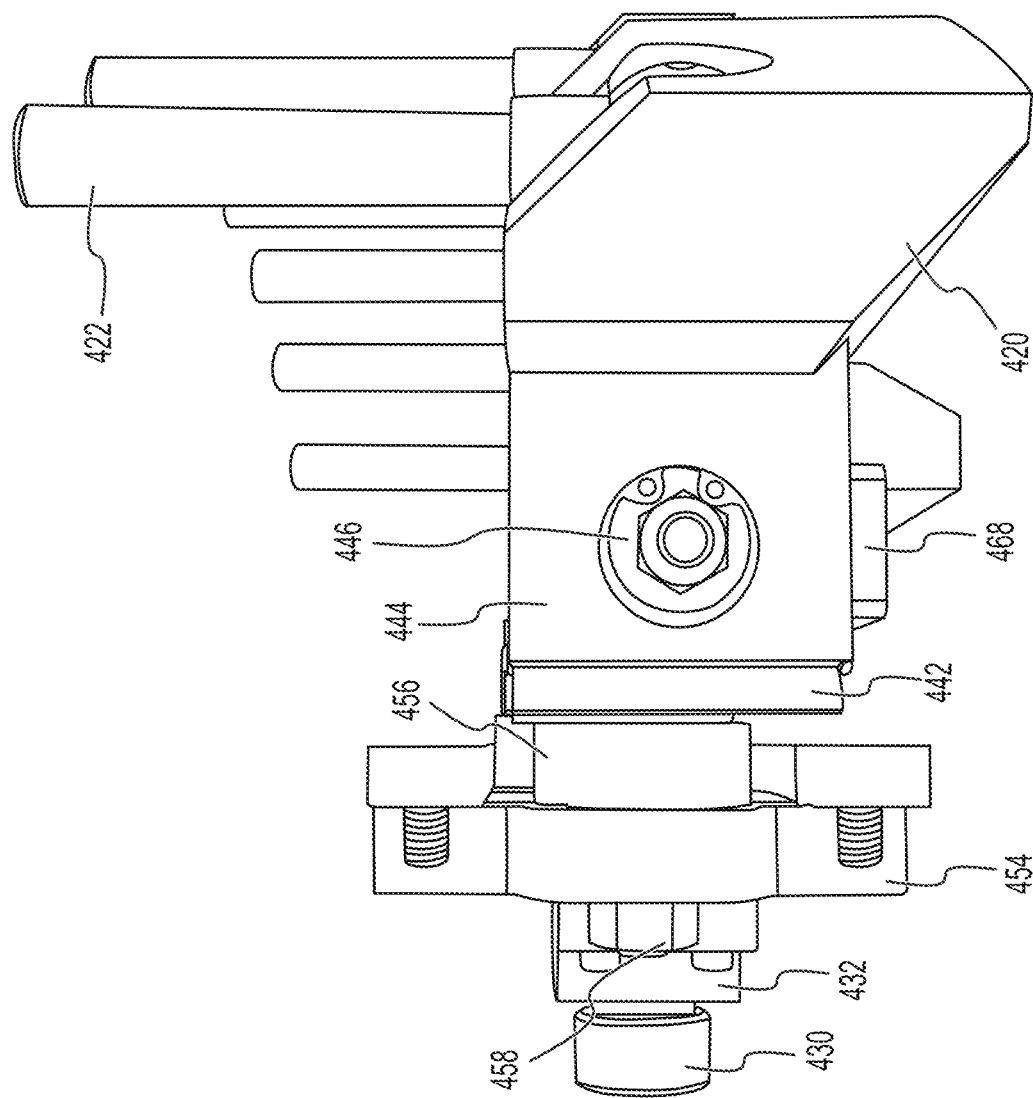
FIG. 13 is a side view of FIG. 11 according to an example embodiment.
Figure 14:
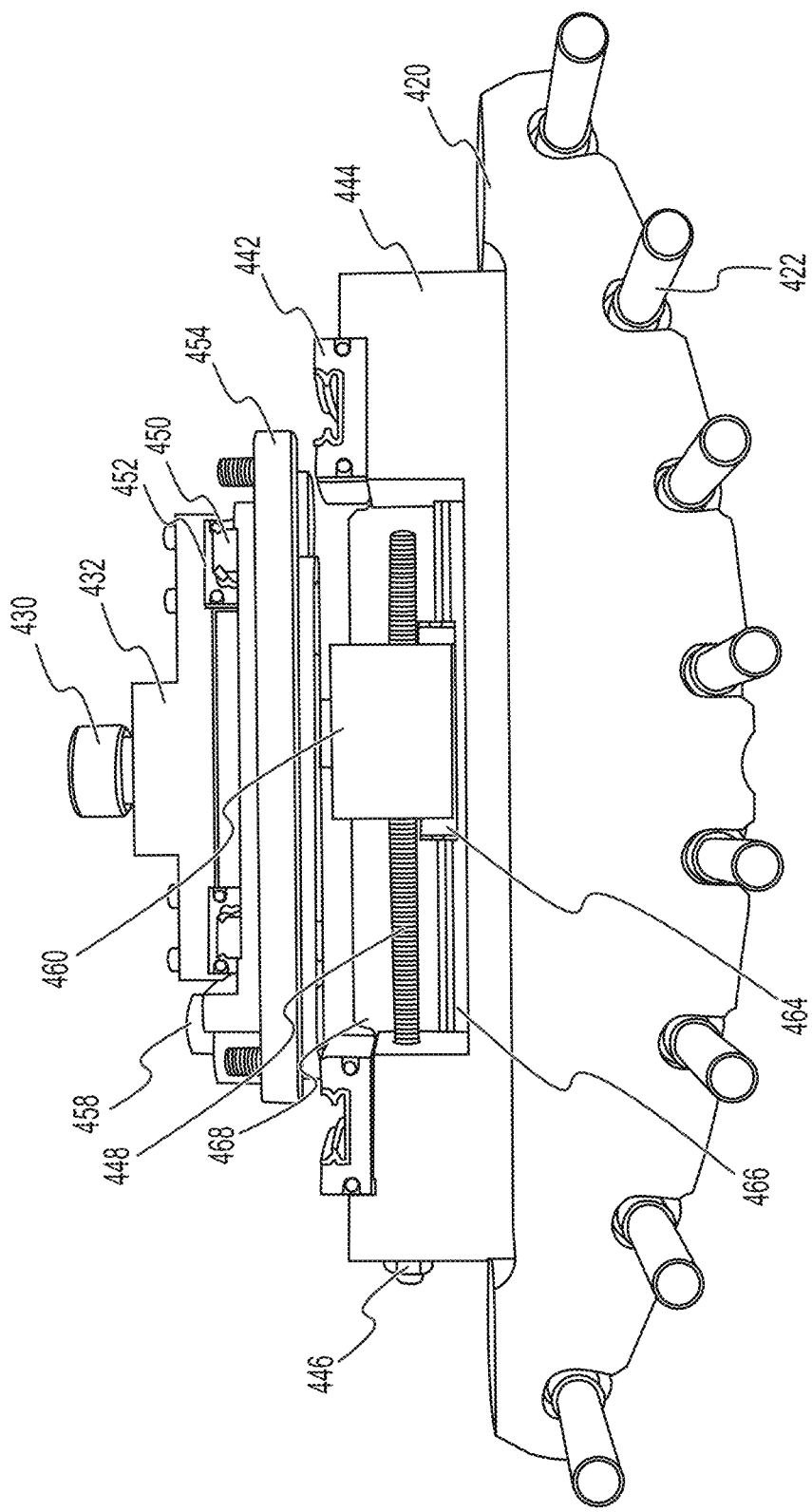
FIG. 14 is a top view of FIG. 11 according to an example embodiment.
Figure 18:
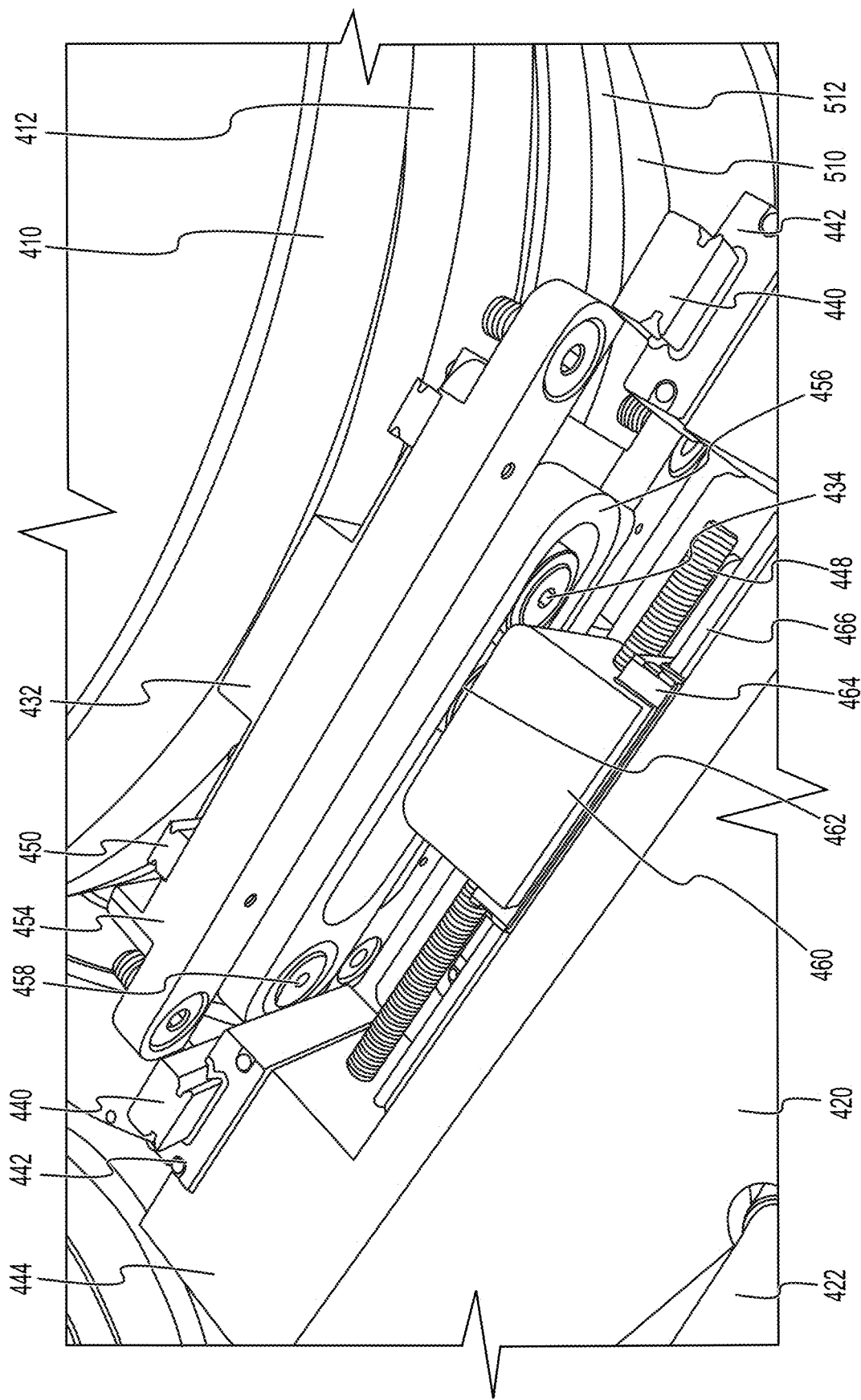
FIG. 18 is an enlarged view of the portion of the apparatus of FIG. 1 including the variable amplitude cam system according to an example embodiment.

FIG. 11 is a partial view of FIG. 10 including the pump assembly according to an example embodiment. Referring to FIG. 11, the pump cam follower 430 of the pump assembly 400 is secured to an auxiliary drive plate 432. The auxiliary drive plate 432 is slidably engaged with the auxiliary rail 450 via an auxiliary slide 452. The auxiliary rail 450 is secured to a ladder brace 454. An auxiliary plate follower 434 (e.g., FIG. 18) is also secured to an opposite side the auxiliary drive plate 432 from the pump cam follower 430. The auxiliary plate follower 434 is configured to engage with the pivotable track 456 such that the pivotable track 456 swings about the track pivot 458 upon movement of the pump cam follower 430 and the auxiliary drive plate 432 along the auxiliary rail 450. When the pivotable track 456 swings about the track pivot 458, an adjuster block follower 462 (which is also engaged with the pivotable track 456, as shown in FIG. 18) will cause the other portions of the pump assembly 400 to move via the primary slide 442, such as a primary drive plate 444 and the pump carriage 420 secured thereto. The position of the adjuster block follower 462 within the pivotable track 456 may be changed by turning the bolt head 446 and will be subsequently discussed in further detail.

The pump plungers 422 for each of the pumping units of the pump assembly 400 are mounted on the pump carriage 420. During the operation of the apparatus 1000, the pump plungers 422 will move in and out of their corresponding pump barrels 424 when the pump carriage 420 moves up and down as the pump assembly 400 travels around the pump cam 410. In particular, a downward movement of the pump carriage 420 will cause the pump plungers 422 to move out of (protract from) their corresponding pump barrels 424, thereby pulling pre-vapor formulation into the pump barrels 424 from the reservoir 100. Conversely, the upward movement of the pump carriage 420 will cause the pump plungers 422 to move into (retract into) their corresponding pump barrels 424, thereby pushing the pre-vapor formulation out of the pump barrels 424 and to the needle assembly 500.

As will be subsequently discussed, the amount of pre-vapor formulation drawn into and pumped from the pump assembly 400 can be adjusted with the variable amplitude cam system. In particular, the pump assembly 400 is configured such that the time period for the pumping of the pre-vapor formulation remains constant and independent of adjustments to the amount of the pre-vapor formulation for pumping to the cartridges 610. Thus, the start time for the pumping of the pre-vapor formulation will be the same during the filling operation, regardless of the amount of pre-vapor formulation being pumped. Similarly, the stop time for the pumping of the pre-vapor formulation will be the same during the filling operation, regardless of the amount of pre-vapor formulation being pumped. In this regard, the flow rate of the pre-vapor formulation will change based on quantity (of pre-vapor formulation to be pumped) determined by the adjustment to the variable amplitude cam system.

FIG. 12 is a front view of FIG. 11 according to an example embodiment. Referring to FIG. 12, the pump plungers 422 are configured to be tractably-engaged with the pump barrels 424 so as to be able to protract and retract. Thus, the top of the pump plungers 422 will be hidden from view during the operation of the apparatus 1000. As a result, the pump plungers 422 will be more visible during the drawing action (when protracted) and less visible during the pumping action (when retracted). The pump plungers 422 may be mounted on the pump carriage 420 via a socket-type arrangement, although example embodiments are not limited thereto.

FIG. 13 is a side view of FIG. 11 according to an example embodiment. Referring to FIG. 13, the initial axial motion imparted to the pump cam follower 430 by the pump track 412 of the pump cam 410 is translated to the adjusted axial motion of the pump carriage 420 by the pivotable track 456 (which is configured to swing about the track pivot 458). The pump assembly 400 may be configured such that a turn of the bolt head 446 in a first direction will decrease the adjusted axial motion of the pump carriage 420 (and, thus, decrease the amount of pre-vapor formulation drawn from the reservoir 100 and pumped to the needle assembly 500). Conversely, the pump assembly 400 may be configured such that a turn of the bolt head 446 in an opposite second direction will increase the adjusted axial motion of the pump carriage 420 (and, thus, increase the amount of pre-vapor formulation drawn from the reservoir 100 and pumped to the needle assembly 500). Furthermore, a locking plate 468 may be secured to the bottom surface of the primary drive plate 444.

FIG. 14 is a top view of FIG. 11 according to an example embodiment. Referring to FIG. 14, an adjuster block 460 is threadedly engaged with an adjuster bolt 448 such that a turn of the bolt head 446 will cause the adjuster block 460 to shift along an adjuster rail 466 via an adjuster slide 464. In particular, the pump assembly 400 may be configured such that a turn of the bolt head 446 in a first direction will cause the adjuster block 460 to shift toward the track pivot 458. In such an instance, the closer position of the adjuster block 460 to the track pivot 458 will result in a smaller axial motion of the pump carriage 420, thereby decreasing the amount of pre-vapor formulation drawn from the reservoir 100 and pumped to the needle assembly 500. Conversely, the pump assembly 400 may be configured such that a turn of the bolt head 446 in an opposite second direction will cause the adjuster block 460 to shift away from the track pivot 458. In such an instance, the farther position of the adjuster block 460 from the track pivot 458 will result in a larger axial motion of the pump carriage 420, thereby increasing the amount of pre-vapor formulation drawn from the reservoir 100 and pumped to the needle assembly 500.

The threaded engagement of the adjuster bolt 448 with the adjuster block 460 allows for a relatively precise control of the quantity of pre-vapor formulation to be pumped to the cartridges 610 during a filling operation. For example, the pump assembly 400 may be calibrated such that markings are provided on the adjuster block 460, the primary drive plate 444, the pivotable track 456, and/or other visible portion of an adjacent structure. In this manner, the bolt head 446 may be turned until, for instance, the marking on the adjuster block 460 is even with a marking on the primary drive plate 444 indicating the target quantity of pre-vapor formulation to be pumped.

In sum, a pump assembly 400 for the automated filling of cartridges 610 of e-vapor devices may include a pump cam follower 430 configured to interact with a pump cam 410 to effectuate a first displacement corresponding to a general drawing action and to effectuate a second displacement corresponding to a general pumping action for a pre-vapor formulation. The pump assembly 400 may additionally include a variable amplitude cam system configured to translate the general drawing action to an adjusted drawing action and to translate the general pumping action to an adjusted pumping action for the pre-vapor formulation.

The pump cam follower 430 is configured to ride within a pump track 412 extending around the pump cam 410. The pump cam 410 may be a barrel cam. The pump cam follower 430 may be configured to effectuate a downward displacement corresponding to the general drawing action and an upward displacement corresponding to the general pumping action.

The variable amplitude cam system may include a pivotable track 456 configured to swing downwards about a track pivot 458 to translate the general drawing action to the adjusted drawing action and to swing upwards about the track pivot 458 to translate the general pumping action to the adjusted pumping action. The variable amplitude cam system may also include an adjuster bolt 448 configured to be rotated to attain a desired translation of the general drawing action and the general pumping action to the adjusted drawing action and the adjusted pumping action, respectively. The general drawing action and the general pumping action may be facilitated with an auxiliary slide 452. The adjusted drawing action and the adjusted pumping action may be facilitated with a primary slide 442.

Figure 15:
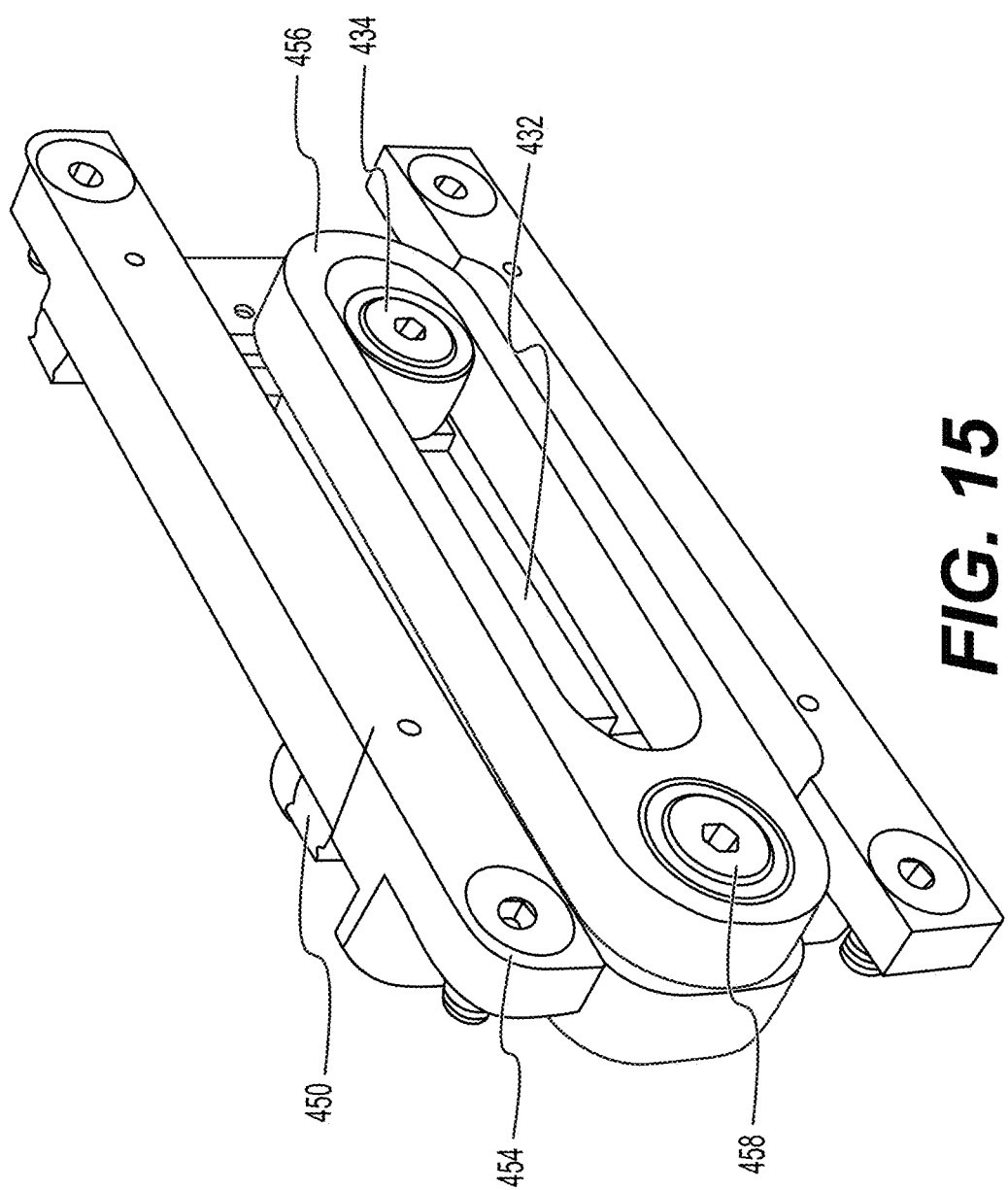
FIG. 15 is a perspective view of a first portion of a variable amplitude cam system including a pivotable track according to an example embodiment.

FIG. 15 is a perspective view of a first portion of a variable amplitude cam system including a pivotable track according to an example embodiment. Referring to FIG. 15, the movement of the auxiliary plate follower 434 will correspond to the movement of the pump cam follower 430 on the opposite side of the auxiliary drive plate 432. The positions of both the pump cam follower 430 and the auxiliary plate follower 434 are fixed on the auxiliary drive plate 432. However, the auxiliary drive plate 432 is moveable via the auxiliary rail 450 and the auxiliary slide 452. As a result, an upward movement of the auxiliary plate follower 434 will cause the pivotable track 456 to swing upwards about the track pivot 458. On the other hand, a downward movement of the auxiliary plate follower 434 will cause the pivotable track 456 to swing downwards about the track pivot 458.

Figure 16:
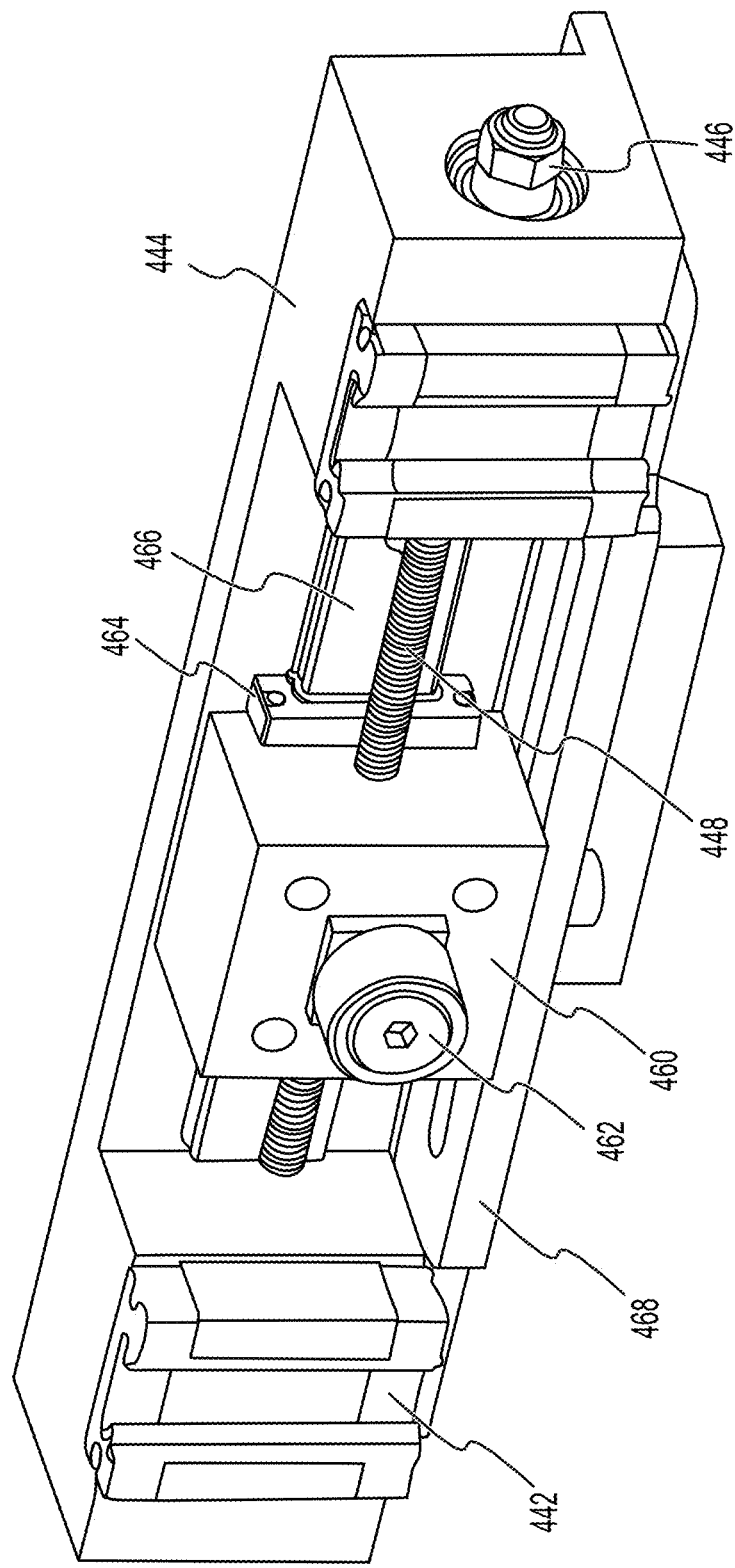
FIG. 16 is a perspective view of a second portion of the variable amplitude cam system that complements the first portion in FIG. 15 and includes an adjuster bolt and an adjuster block according to an example embodiment.

FIG. 16 is a perspective view of a second portion of the variable amplitude cam system that complements the first portion in FIG. 15 and includes an adjuster bolt and an adjuster block according to an example embodiment. Referring to FIG. 16, the adjuster block follower 462 is configured to be positioned within the slot path defined by the pivotable track 456 so as to be between the track pivot 458 and the auxiliary plate follower 434. The variable amplitude cam system may be configured such that a rotation of the bolt head 446 in a first direction will cause the adjuster block follower 462 to shift toward the bolt head 446 via the adjuster slide 464 and the adjuster rail 466. Conversely, the variable amplitude cam system may be configured such that a rotation of the bolt head 446 in an opposite second direction will cause the adjuster block follower 462 to shift away from the bolt head 446 via the adjuster slide 464 and the adjuster rail 466. In addition, the locking plate 468 may help distribute the force applied to the adjuster block follower 462 by the pivotable track 456.

Figure 17:
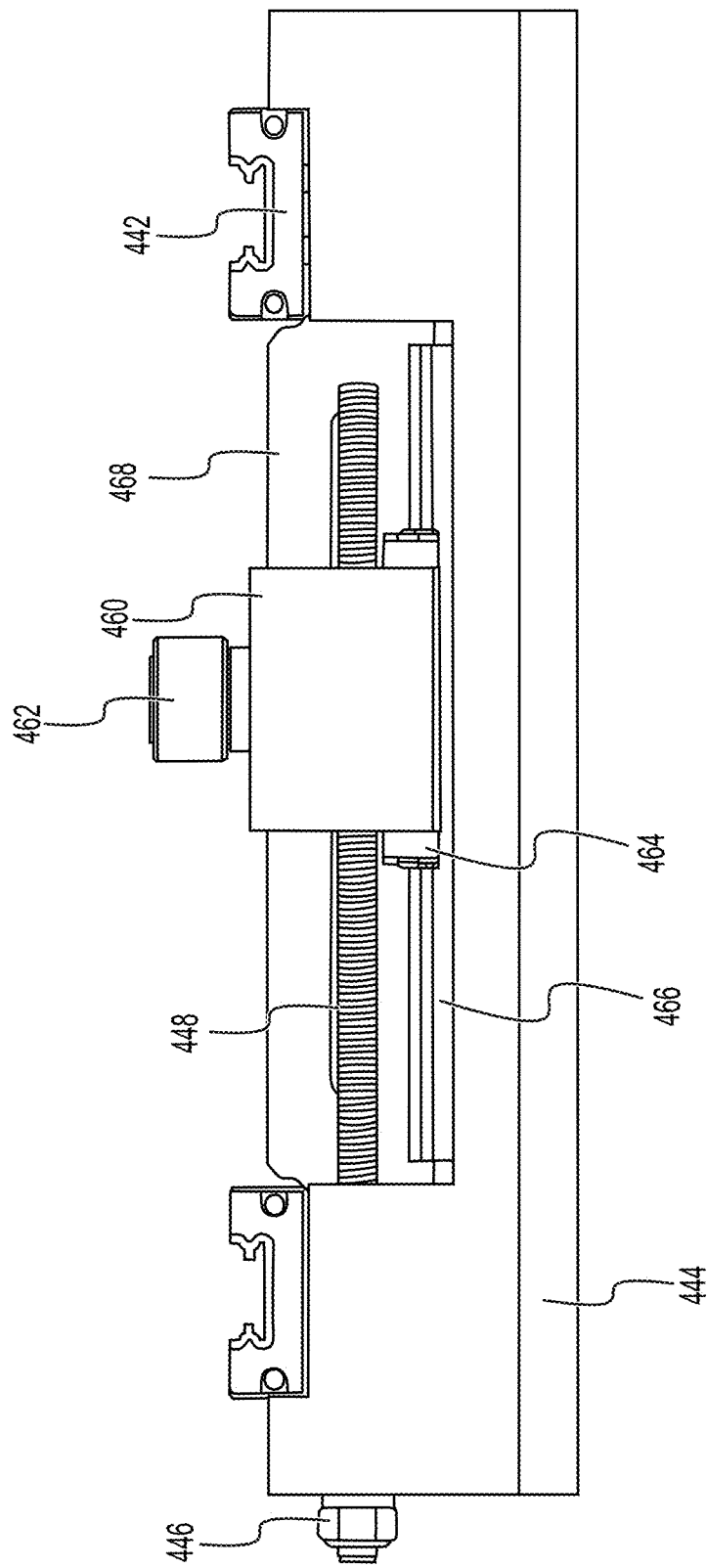
FIG. 17 is a top view of FIG. 16 according to an example embodiment.

FIG. 17 is a top view of FIG. 16 according to an example embodiment. Referring to FIG. 17, the shift of the adjuster block 460 toward the bolt head 446 upon rotation of the bolt head 446 in the first direction will also result in the adjuster block follower 462 shifting along the slot path of the pivotable track 456 toward the track pivot 458. On the other hand, the shift of the adjuster block 460 away from the bolt head 446 upon rotation of the bolt head 446 in the opposite second direction will also result in the adjuster block follower 462 shifting along the slot path of the pivotable track 456 away from the track pivot 458. The relative distance of the adjuster block follower 462 from the track pivot 458 will determine the adjusted axial motion of the primary drive plate 444 (and the pump carriage 420).

In sum, a variable amplitude cam system for an apparatus 1000 for automated filling of cartridges 610 of e-vapor devices may include a pivotable track 456 configured to swing about a track pivot 458. The variable amplitude cam system may additionally include an adjuster block arrangement interfacing with the pivotable track 456 such that a swinging of the pivotable track 456 about the track pivot 458 translates to a displacement of the adjuster block arrangement. The variable amplitude cam system may further include an adjuster bolt 448 configured to mate with the adjuster block arrangement via a thread engagement. In an example embodiment, the adjuster bolt 448 is configured to be rotatable to effectuate an incremental shift of the adjuster block arrangement along the adjuster bolt 448 so as to adjust an amount of pre-vapor formulation for pumping to the cartridges 610.

The adjuster block arrangement may be configured to shift toward the track pivot 458 when the adjuster bolt 448 is rotated in a first direction so as to decrease the amount of pre-vapor formulation for pumping to the cartridges 610. Conversely, the adjuster block arrangement may be configured to shift away from the track pivot 458 when the adjuster bolt 448 is rotated in an opposite second direction so as to increase the amount of pre-vapor formulation for pumping to the cartridges 610.

The adjuster block arrangement may include an adjuster block 460 and an adjuster block follower 462 secured to the adjuster block 460. The pivotable track 456 may define a slot path therein. The adjuster block follower 462 may be configured to shift along the slot path of the pivotable track 456 in response to a rotation of the adjuster bolt 448.

The adjuster block 460 may define an internally-threaded through hole therein. The adjuster bolt 448 may have an externally-threaded surface and a bolt head 446 at a proximal end of the adjuster bolt 448. The adjuster bolt 448 may extend though the adjuster block 460. In an example embodiment, the externally-threaded surface of the adjuster bolt 448 is engaged with the internally-threaded through hole of the adjuster block 460. The adjuster bolt 448 may be rotatable via the bolt head 446 so as to shift the adjuster block 460 along a length of the adjuster bolt 448. The adjuster bolt 448 may be configured to alter a vertical displacement of the adjuster block arrangement resulting from the swinging of the pivotable track 456 by altering a distance of the adjuster block arrangement from the track pivot 458.

The pivotable track 456 may be configured to swing downwards to effectuate a drawing action for procuring the pre-vapor formulation from a reservoir 100. Conversely, the pivotable track 456 may be configured to swing upwards to effectuate a pumping action for pushing the pre-vapor formulation to the cartridges 610.

FIG. 18 is an enlarged view of the portion of the apparatus of FIG. 1 including the variable amplitude cam system according to an example embodiment. Referring to FIG. 18, when the pump assembly 400 travels around the pump cam 410 during a filling operation, the auxiliary drive plate 432 will undergo an initial axial motion as a result of the varied path of the pump cam follower 430 within the pump track 412. The auxiliary plate follower 434 will mimic the initial axial motion of the auxiliary drive plate 432 and cause the pivotable track 456 to swing about track pivot 458. The swinging of the pivotable track 456 will, in turn, cause the adjusted axial motion of the pump carriage 420 via the adjuster block follower 462 for drawing the pre-vapor formulation from the reservoir 100 and pumping the pre-vapor formulation to the needle assembly 500.

The adjusted axial motion of the pump carriage 420 will be a function of the distance of the adjuster block follower 462 to the track pivot 458. In particular, the closer the adjuster block follower 462 is to the track pivot 458, the smaller the adjusted axial motion and, thus, the less pre-vapor formulation is drawn from the reservoir 100 and pumped to the cartridges 610. The adjuster block follower 462 may be incrementally shifted toward the track pivot 458 by rotating the bolt head 446 in a first direction. Conversely, the farther the adjuster block follower 462 is from the track pivot 458, the greater the adjusted axial motion and, thus, the more pre-vapor formulation is drawn from the reservoir 100 and pumped to the cartridges 610. The adjuster block follower 462 may be incrementally shifted away from the track pivot 458 by rotating the bolt head 446 in an opposite second direction.

In sum, a method for the automated filling of cartridges 610 of e-vapor devices may include adjusting a fill amount of pre-vapor formulation by modifying a pump stroke length with a pivotable track 456 and an adjuster bolt 448 while maintaining a constant time period for pumping the pre-vapor formulation into the cartridges 610.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An apparatus for automated filling of cartridges of e-vapor devices, comprising:
a filling drum configured to receive at least one cartridge of an e-vapor device, the filling drum defining a plurality of flutes, each flute of the plurality of flutes being configured to receive a cartridge of the at least one cartridge, the filling drum being configured to rotate while transporting the at least one cartridge;
a pump assembly configured to pump a pre-vapor formulation into the at least one cartridge during rotation of the filling drum and transportation of the at least one cartridge; and
at least one switch valve arranged above the pump assembly and configured to control the pumping of the pre-vapor formulation into the at least one cartridge by rotating between a first position and a second position, the first position allowing the pre-vapor formulation into the pump assembly, the second position allowing the pumping of the pre-vapor formulation into the at least one cartridge.

2. The apparatus of claim 1, wherein the filling drum is configured to receive the at least one cartridge while in motion, and the pump assembly is configured to pump during a time period coinciding with at least a 250 degree rotation of the filling drum.

3. The apparatus of claim 1, wherein each flute of the plurality of flutes includes a vacuum port configured to retain the cartridge of the at least one cartridge in the flute and to timely release the cartridge from the flute.

4. The apparatus of claim 1, wherein each flute of the plurality of flutes includes a blow port configured to selectively eject the cartridge of the at least one cartridge from the flute.

5. The apparatus of claim 1, wherein the filling drum includes a supporting ledge extending under the plurality of flutes, the supporting ledge being configured to retain the at least one cartridge in the plurality of flutes.

6. The apparatus of claim 1, further comprising a needle assembly including at least one hypodermic needle.

7. The apparatus of claim 6, wherein the needle assembly is configured to move the at least one hypodermic needle within the at least one cartridge during an operation of the pump assembly.

8. The apparatus of claim 1, wherein the pump assembly includes a variable amplitude cam system configured to adjust an amount of the pre-vapor formulation for pumping to the at least one cartridge without changing start and stop times for the pumping.

9. The apparatus of claim 1, wherein the pump assembly is configured such that a time period for pumping the pre-vapor formulation remains constant and independent of adjustments to an amount of the pre-vapor formulation for pumping to the at least one cartridge.

10. The apparatus of claim 1, further comprising:
a feed drum configured to transfer the at least one cartridge to the filling drum.

11. The apparatus of claim 10, further comprising:
an exit drum configured to remove the at least one cartridge from the filling drum,
wherein the filling drum, the feed drum, and the exit drum are configured to rotate synchronously such that the at least one cartridge is conveyed in a continuous motion from the feed drum to the exit drum via the filling drum.

12. A method of automatically filling cartridges of e-vapor devices, comprising:
receiving at least one cartridge of an e-vapor device in a filling drum;
transitioning a needle assembly including at least one hypodermic needle from a raised state to a lowered state;
pumping, by a pump assembly, a pre-vapor formulation into the at least one cartridge when the needle assembly is in the lowered state;
moving the at least one hypodermic needle within the at least one cartridge during the pumping; and
controlling the pumping of the pre-vapor formulation into the at least one cartridge by rotating at least one switch valve between a first position and a second position, the first position allowing the pre-vapor formulation into the pump assembly, the second position allowing the pumping of the pre-vapor formulation into the at least one cartridge, the at least one switch valve arranged above the pump assembly.

13. The method of claim 12, further comprising:
adjusting, with a variable amplitude cam system of the pump assembly, an amount of the pre-vapor formulation for pumping to the at least one cartridge without changing start and stop times for the pumping.

14. The method of claim 12, wherein the receiving the at least one cartridge includes rotating the filling drum to receive the at least one cartridge while the filling drum is in motion, and the pumping occurs during a time period coinciding with at least a 250 degree rotation of the filling drum.

15. The method of claim 12, wherein the pumping the pre-vapor formulation into the at least one cartridge includes pumping the pre-vapor formulation while the filling drum is in motion.

16. The method of claim 12, wherein a time period for the pumping of the pre-vapor formulation remains constant and independent of adjustments to an amount of the pre-vapor formulation for pumping to the at least one cartridge.

17. The method of claim 12, further comprising:
delivering, by a feed drum, the at least one cartridge to the filling drum.

18. The method of claim 17, further comprising:
removing, by an exit drum, the at least one cartridge from the filling drum.

19. The method of claim 18, further comprising:
rotating the filling drum, the feed drum, and the exit drum synchronously such that the at least one cartridge is conveyed in a continuous motion from the feed drum to the exit drum via the filling drum.

20. The method of claim 12, further comprising:
removing, by an exit drum, the at least one cartridge from the filling drum.

\* \* \* \* \*